(12) United States Patent
Green et al.

(10) Patent No.: US 11,874,961 B2
(45) Date of Patent: Jan. 16, 2024

(54) MANAGING DISPLAY OF AN ICON IN AN EYE TRACKING AUGMENTED REALITY DEVICE

(71) Applicant: Tectus Corporation, Saratoga, CA (US)

(72) Inventors: Ben Rafael Kimel Green, Alameda, CA (US); Dominic Philip Haine, Burlingame, CA (US)

(73) Assignee: TECTUS CORPORATION, Saratoga, CA (US)

( * ) Notice: Subject to any disclaimer, the term of this patent is extended or adjusted under 35 U.S.C. 154(b) by 0 days.

(21) Appl. No.: 17/740,295

(22) Filed: May 9, 2022

(65) Prior Publication Data
US 2023/0359272 A1 Nov. 9, 2023

(51) Int. Cl.
*G06F 3/01* (2006.01)
*G06F 3/04815* (2022.01)
(Continued)

(52) U.S. Cl.
CPC ......... *G06F 3/013* (2013.01); *G02B 27/0093* (2013.01); *G02B 27/0101* (2013.01); *G02B 27/017* (2013.01); *G02B 27/0179* (2013.01); *G02C 7/04* (2013.01); *G02C 7/083* (2013.01); *G06F 3/04815* (2013.01);
(Continued)

(58) Field of Classification Search
None
See application file for complete search history.

(56) References Cited

U.S. PATENT DOCUMENTS 5,844,544 A 12/1998 Kahn
8,430,310 B1 4/2013 Ho
(Continued)

FOREIGN PATENT DOCUMENTS

CN 106445115 A 2/2017
CN 107092346 A 8/2017
(Continued)

OTHER PUBLICATIONS

International Search Report and Written Opinion in PCT/US2020/056376, dated Jan. 12, 2021, 10 pages.
(Continued)

*Primary Examiner* — Kirk W Hermann
(74) *Attorney, Agent, or Firm* — Amsel IP Law PLLC; Jason Amsel

(57) ABSTRACT

An augmented reality device manages display of an interactive icon in a manner that enables selection by a simple and intuitive gesture. The interactive icon may initially be displayed at a predefined target position outside the fovea where it is visible in the near peripheral vision without being distracting to the user. The augmented reality device may control the icon to behave like a stationary object with respect to changes in orientation until selection or repositioning criteria are met. Upon detection repositioning criteria, the augmented reality device may reposition the icon to the target position. Selection of the icon may control functions such as alerting the user to an available notification, opening or closing a menu, or performing other actions associated with operation of the augmented reality device.

22 Claims, 20 Drawing Sheets

(51) Int. Cl.
  *G06F 3/04817*  (2022.01)
  *G02B 27/00*    (2006.01)
  *G02B 27/01*    (2006.01)
  *G02C 7/04*     (2006.01)
  *G02C 7/08*     (2006.01)

(52) U.S. Cl.
  CPC .... *G06F 3/04817* (2013.01); *G02B 2027/014* (2013.01); *G02B 2027/0138* (2013.01); *G02B 2027/0187* (2013.01)

(56) References Cited

U.S. PATENT DOCUMENTS

| | | |
|---|---|---|
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |
| 8,890,946 B2 | 11/2014 | Publicover |
| 8,911,087 B2 | 12/2014 | Publicover |
| 8,960,898 B1 | 2/2015 | Etzkorn |
| 8,964,298 B2 | 2/2015 | Haddick |
| 8,971,978 B2 | 3/2015 | Ho |
| 8,989,834 B2 | 3/2015 | Ho |
| 9,028,068 B2 | 5/2015 | Chang |
| 9,047,512 B2 | 6/2015 | Otis |
| 9,052,533 B2 | 6/2015 | Pugh |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |
| 9,298,020 B1 | 3/2016 | Etzkorn |
| 9,341,843 B2 | 5/2016 | Border |
| 9,390,326 B2 | 7/2016 | Publicover |
| 9,405,365 B2 | 8/2016 | Publicover |
| 9,600,069 B2 | 3/2017 | Publicover |
| 9,870,060 B2 | 1/2018 | Marggraff |
| 9,921,645 B2 | 3/2018 | Theytaz |
| 10,025,379 B2 | 7/2018 | Drake |
| 10,178,367 B2 | 1/2019 | Zhou |
| 10,345,621 B2 | 7/2019 | Franklin |
| 10,353,463 B2 | 7/2019 | Shtukater |
| 10,901,505 B1 | 1/2021 | Haine |
| 2004/0155907 A1 | 8/2004 | Yamaguchi |
| 2009/0066722 A1 | 3/2009 | Kriger |
| 2010/0231504 A1 | 9/2010 | Bloem |
| 2011/0221659 A1 | 9/2011 | King, III |
| 2013/0145304 A1 | 6/2013 | Deluca |
| 2014/0063054 A1 | 3/2014 | Osterhout |
| 2014/0098226 A1 | 4/2014 | Pletcher |
| 2014/0168056 A1 | 6/2014 | Swaminathan |
| 2014/0198128 A1 | 7/2014 | Hong |
| 2014/0347265 A1 | 11/2014 | Aimone |
| 2014/0354539 A1 | 12/2014 | Skogö |
| 2015/0143234 A1 | 5/2015 | Norris, III |
| 2015/0192992 A1 | 7/2015 | Di Censo |
| 2015/0205106 A1 | 7/2015 | Norden |
| 2015/0212576 A1 | 7/2015 | Ambrus |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0338915 A1 | 11/2015 | Publicover |
| 2015/0339857 A1 | 11/2015 | O'Connor |
| 2015/0362749 A1 | 12/2015 | Biederman |
| 2015/0362753 A1 | 12/2015 | Pletcher |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0025981 A1 | 1/2016 | Burns |
| 2016/0091737 A1 | 3/2016 | Kim |
| 2016/0133201 A1 | 5/2016 | Border |
| 2016/0195924 A1 | 7/2016 | Weber |
| 2016/0253831 A1 | 9/2016 | Schwarz |
| 2016/0274660 A1 | 9/2016 | Publicover |
| 2016/0283595 A1 | 9/2016 | Folkens |
| 2017/0019661 A1 | 1/2017 | Deering |
| 2017/0023793 A1 | 1/2017 | Shtukater |
| 2017/0115742 A1 | 4/2017 | Xing |
| 2017/0123492 A1 | 5/2017 | Marggraff |
| 2017/0131764 A1 | 5/2017 | Bognar |
| 2017/0177078 A1 | 6/2017 | Henderek |
| 2017/0270636 A1 * | 9/2017 | Shtukater .................. G06T 1/20 |
| 2017/0285742 A1 | 10/2017 | Marggraff |
| 2017/0371184 A1 | 12/2017 | Shtukater |
| 2018/0120568 A1 | 5/2018 | Miller |
| 2018/0149884 A1 | 5/2018 | Miller |
| 2018/0173011 A1 | 6/2018 | Barrows |
| 2018/0180980 A1 | 6/2018 | Ouderkirk |
| 2018/0275753 A1 | 9/2018 | Publicover |
| 2018/0335835 A1 | 11/2018 | Lemoff |
| 2018/0348969 A1 | 12/2018 | Kawamura |
| 2019/0056785 A1 | 2/2019 | Suk |
| 2019/0235624 A1 | 8/2019 | Goldberg |
| 2019/0250408 A1 | 8/2019 | Lafon |
| 2019/0250432 A1 | 8/2019 | Kim |
| 2019/0324276 A1 * | 10/2019 | Edwin ................ G02B 27/0172 |
| 2019/0377428 A1 | 12/2019 | Mirjalili |
| 2019/0390976 A1 | 12/2019 | Anderson |
| 2020/0073122 A1 | 3/2020 | Rothkopf |
| 2020/0193677 A1 * | 6/2020 | Vaganov ................. A63F 13/65 |
| 2021/0026444 A1 | 1/2021 | Haine |
| 2021/0072821 A1 | 3/2021 | Von Und Zu Liechtenstein |
| 2021/0124415 A1 | 4/2021 | Haine |
| 2021/0208674 A1 | 7/2021 | Haine |
| 2022/0121344 A1 | 4/2022 | Pastrana Vicente |

FOREIGN PATENT DOCUMENTS

| | | |
|---|---|---|
| JP | 3918911 B2 * | 5/2007 |
| WO | 2016195201 A1 | 12/2016 |
| WO | 2018109570 | 6/2018 |

OTHER PUBLICATIONS

Christiansen et al, editors. Motion Sensors Explainer. W3C Working Group Note, Aug. 30, 2017. retrieved from [https://www.w3.org/TR/motion-sensors/] on [Oct. 21, 2021]. (Year: 2017).
WO2016195201A1 English translation (Year: 2016).
CN107092346A English translation (Year: 2017).

* cited by examiner

MANAGING DISPLAY OF AN ICON IN AN EYE TRACKING AUGMENTED REALITY DEVICE

BACKGROUND

1. Technical Field

This disclosure relates generally to managing display of an icon in an eye tracking augmented reality device.

2. Description of Related Art

In an augmented reality device such as an electronic contact lens, smart glasses, or head-mounted device, a display presents one or more virtual objects as images that may be overlaid with a view of the real-world physical environment. To visually integrate the virtual objects with the real-world environment and to enable various interactions with the virtual objects, it is desirable for the augmented reality device to be able to track eye movement. In an electronic contact lens, changes in orientation of the eye can be directly sensed by integrated motion sensors since the electronic contact lens is mounted to the eye. In other types of augmented reality devices (e.g., smart glasses or other head mounted displays), eye movement can instead be tracked by capturing video of the eye using an eye-facing camera and applying various motion detection algorithms to the captured video. In such devices, it is often desirable to enable the user to interact with a virtual object (e.g., an icon) to trigger various functions of the augmented reality device. However, a challenge remains in how to present and detect intended interactions with virtual objects in a user-friendly way.

BRIEF DESCRIPTION OF THE DRAWINGS

Figure (FIG. 1 is a block diagram of an augmented reality system.

DETAILED DESCRIPTION

An augmented reality device manages display of an interactive icon in a manner that makes the user aware of its presence without being distracting. The augmented reality device furthermore enables interactions with the icon using a simple and intuitive eye gesture that is detectable with a high degree of certainty. The interactive icon may control functions such as alerting the user to an available notification, opening or closing a menu, or performing other actions associated with operation of the augmented reality device.

The interactive icon may initially be presented at a target position that is at a fixed offset from the center of gaze in the user's near peripheral vision outside the fovea. Projecting the icon at this location generally makes the user aware of its presence without obscuring or directly interfering with the user's focal point. As the user's gaze direction shifts in the vicinity of the icon, the augmented reality device controls the icon to simulate the appearance of a stable object in the world view. When the user's gaze direction substantially overlaps with the position of the icon, the augmented reality device detects a selection of the icon. From the user's perspective, this selection gesture can be performed simply and intuitively by trying to look at the icon. If the user instead looks away from the icon, the augmented reality device may reposition the icon back to the target position at the fixed offset from the center of gaze. Various techniques may be used to determine when and how to reposition the icon in a manner that is not distracting to the user.

Figure 1:
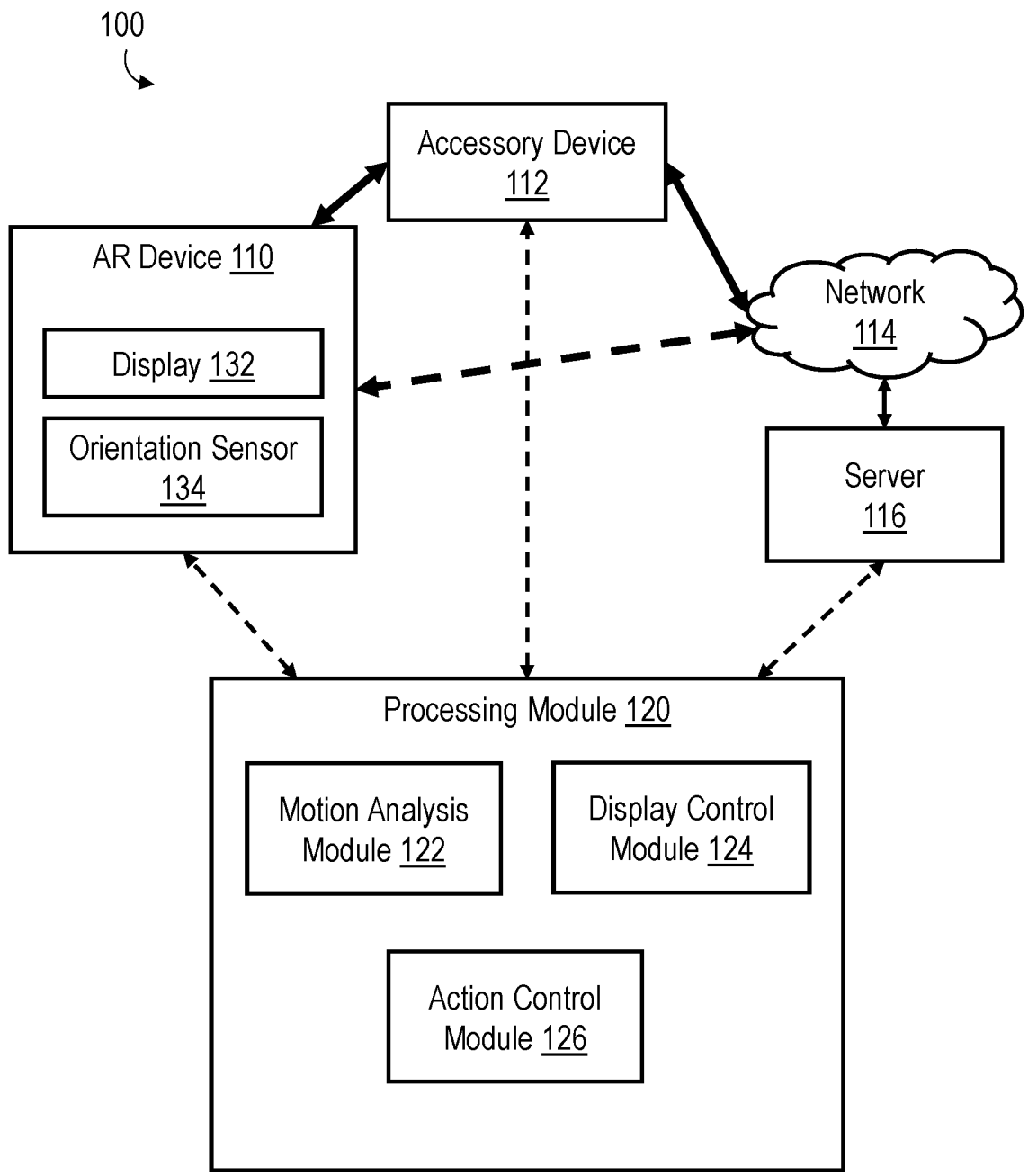

FIG. 1 is a block diagram of an example augmented reality system 100. The augmented reality system 100 includes an augmented reality (AR) device 110, an optional accessory device 112, a network 114, and a server 116. The augmented reality device 110 includes a display 132 for displaying one or more virtual objects and an orientation sensor 134 for tracking orientation of the eye. The display 132 projects images directly onto a viewer's retina in a manner that allows the viewer to perceive the virtual objects as if they are present in the real-world environment. The display 132 may display images by projecting light that is additive to light from the environment such that use perceives the images as overlays. Where no images are displayed, the user may view the environment in an unobstructed way. The orientation sensor 134 senses orientation of the eye to implement various functions of the augmented reality device 110. For example, the display of virtual objects may be updated to compensate for tracked changes in the eye orientation to simulate the appearance of real-world objects or to present other effects. Furthermore, the orientation sensor 134 may detect various eye gestures to invoke functions of the augmented reality system 100.

In an embodiment, the augmented reality device 110 comprises an electronic contact lens mounted to the eye. The display 132 may comprise a small projector that is integrated in the electronic contact lens and moves together with the eye. An image projected in a stable way will therefore inherently track the gaze direction and will be perceived by the viewer as moving around the room as the eye orientation changes. For certain functions, the display 132 may instead update the position of a virtual object to compensate for changes in orientation to simulate the appearance of an object that is stationary in the perceived world view. In an eye-mounted device, orientation may be derived from motion sensors (e.g., a gyroscope, accelerometer, and/or magnetometer) integrated in the device. An example embodiment of an electronic contact lens is described in further detail below with respect to FIGS. 10A-C.

In another embodiment, the augmented reality device 110 is a head-mounted device that is not directly mounted to the eye. In this embodiment, the display 132 is substantially stable relative to the head position (i.e., it tracks with head movement through an external environment) but the eye orientation can change relative to the display 132. Thus, unlike an eye-mounted device, the center of gaze can move relative to a stable image projected by the device 132. To track eye orientation in a head-mounted device, an eye-facing camera may capture video of the eye and a motion tracking algorithm may be applied to track eye orientation. The display 132 may update the position of a virtual object based on tracked eye motion to achieve similar capabilities as the eye-mounted device described above. In yet further embodiments, a different eye tracking system may be used that is not necessarily camera-based. For example, a light scanning system may track eye movements by scanning light across the eye and detecting reflections using a light sensor.

The optional accessory device 112 is a computing device that may be communicatively coupled to the augmented reality device 110 (e.g., via a wireless interface) and perform computing or storage functions that support operation of the augmented reality device 110. The accessory device 112 may be embodied as a smart phone, tablet, smart watch, laptop or desktop computer, or a wearable device (e.g., necklace, headband, waistband, etc.) with integrated electronics. The accessory device 112 may also be connected to a server 116 via a network 114. The server 116 provides access to various information relevant to operation of the augmented reality device 110 and may furthermore provide additional computing or storage functions that support operation of the augmented reality device 110.

The accessory device 112, server 116, and/or the network 114 may be optionally omitted. For example, all functions could instead be performed only on the augmented reality device 110, on a combination of the augmented reality device 110 and the accessory device 112, or on a combination of the augmented reality device 110 and the server 116 via a direct connection of the augmented reality device 110 with the network 114.

A processing module 120 performs processing associated with various functions of the augmented reality device 110 such as generating virtual images, tracking eye motion, initiating various actions responsive to detected eye gestures, and performing other functions related to operation of the augmented reality system 100 described herein. Various components of the processing module 120 may be implemented in whole or in part in the augmented reality device 110, the accessory device 112, the server 116, or a combination thereof.

The processing module 120 includes a motion analysis module 122, a display control module 124, and an action control module 126. Other embodiments may include different, additional, or fewer components.

The motion analysis module 122 derives eye orientation indicative of a gaze direction based on motion sensing data from the orientation sensor 134 (e.g., from either eye-mounted motion sensors of an eye-mounted device or an eye-facing camera of a head-mounted device). The motion analysis module 122 may apply various filters and/or functions to the raw sensor data to detect the changes in orientation. The motion analysis module 122 may furthermore characterize detected eye movements over time to identify specific types of eye motion such as saccades, drifts, or other eye motions. Moreover, the motion analysis module 122 may detect predefined sequences of motions consistent with eye gestures for invoking various actions.

The display control module 124 controls display of one or more virtual objects by the display 132. The virtual objects may comprise, for example, icons, text, menus, or other elements. The virtual objects may provide information to the user (e.g., in the form of notifications, messages, or information displays) or to provide interactive elements (e.g., menus or control elements) for enabling the user to control functions of the augmented reality device 110. Examples of techniques for displaying and detecting interactions with icons are described in further detail below with respect to FIGS. 2-9.

The action control module 126 controls various actions of the augmented reality device 110 in response to detected eye gestures or interactions with virtual objects. For example, the action control module 126 may control display or dismissal of notifications or other messages, switching between power states, configuration of various settings or preferences, or other actions of the augmented reality device 110 in response to eye movements.

Figure 2:
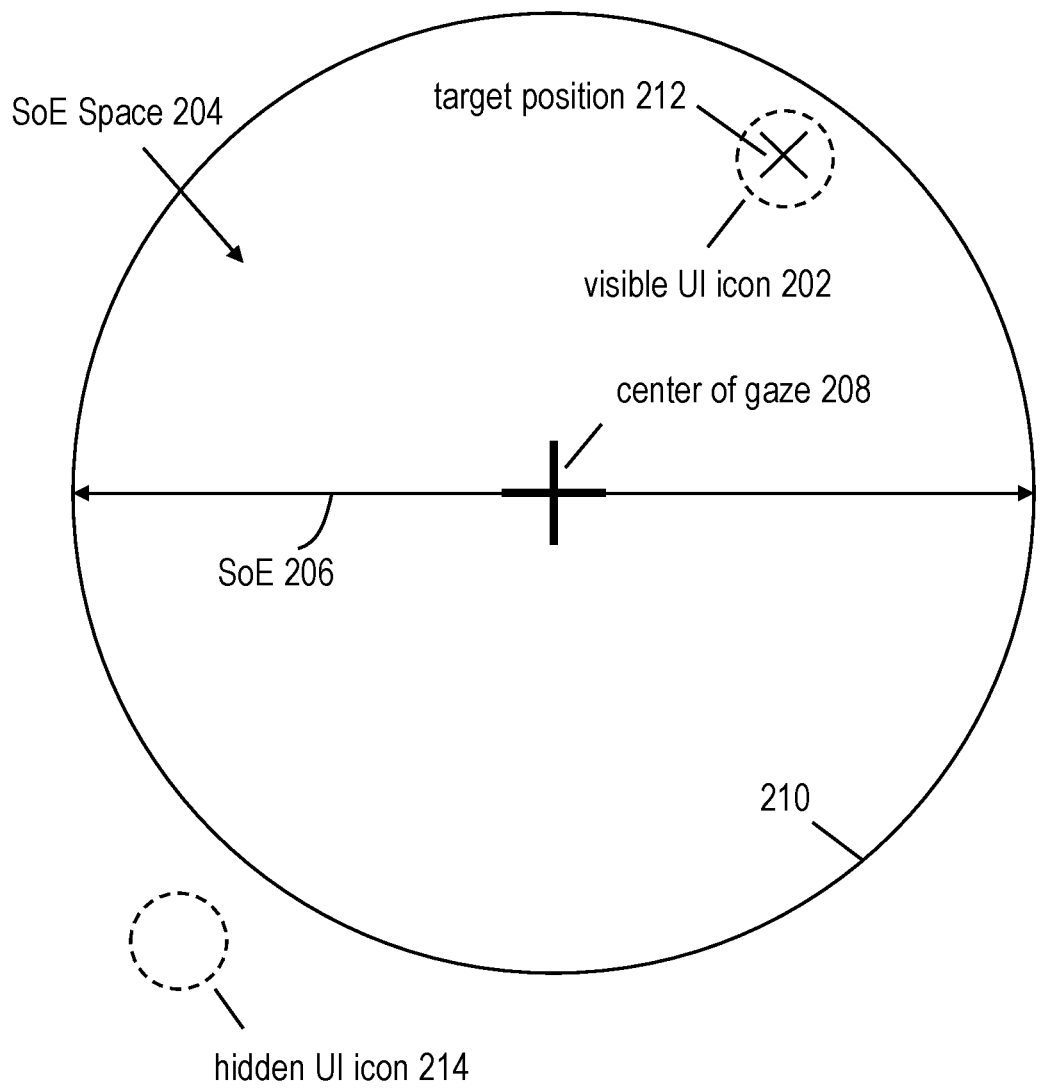
FIG. 2 is a diagram illustrating an icon positioned at a target position within a span of eccentricity (SoE) space of a display device.

FIG. 2 illustrate an example of a technique for presenting an interactive icon 202 in an augmented reality device 110. The icon 202 may comprise, for example, a notification icon to inform a viewer of an available message, a control element for initiating an action of the augmented reality device 110, or a visual element serving a different purpose. In general, it is desirable for the icon to be noticed by the viewer without being distracting or impairing the viewer's vision. Furthermore, it is desirable for a viewer to be able to interact with the icon 202 using a simple eye gesture that can be detectable with a high degree of certainty.

In FIG. 2, the Span of Eccentricity (SoE) 206 represents the angular extent of an image space projectable onto the viewer's retina by the display device 132. A circle 210 representing the edge of the image space projectable onto the retina has a diameter equivalent to the SoE 206. The area inside the circle 210 represents the area available for projecting images onto the retina and is referred to herein as the SoE space 204. In the embodiments herein, the augmented reality device 110 projects images such that the SoE space 204 is substantially centered on the fovea, which is a small area around the center of gaze 208, also referred to herein as the gaze direction 208. In practice, the SoE space 204 may not be exactly centered due to small alignment errors between the display device 132 and the eye. However, for purposes herein, terms such as "centered" may encompass such margins of error as may be expected in a augmented reality device 110 like the ones described herein (e.g., within 1%, within 5%, within 10%, etc.).

In an electronic contact lens, the projectable image space of the display 132 inherently corresponds to the SoE space 206 because the display 132 is mounted to the eye and the full extent of the projectable image is directed onto the retina. Furthermore, the alignment of the display device 132 and the fovea is naturally retained once the lens is properly mounted to the eye because the contact lens rotates together with the eye. Thus, the SoE space 204 inherently remains centered at the center of gaze 208 regardless of any change in eye orientation. In a head-mounted device where the display 132 is not physically mounted to the eye, the augmented reality device 110 may detect changes in eye orientation and update the projection direction based on the changes. In this way, the head-mounted device actively controls its projectable image space to be directed at the retina and centered at the center of gaze 208 so that the projectable image space substantially corresponds to the SoE space 204. Thus, the head-mounted display may simulate the same effect as an eye-mounted device. In either implementation, it is not possible for the user to look outside the SoE space 204 or even towards the periphery of the SoE space 204. Rather, when the eye orientation changes, the new gaze direction 208 defines the center of the SoE space 204.

In the illustrated example, a visible icon 202 is shown at a target position 212. The target position 212 is defined with respect to the SoE space 204 at a fixed offset from the gaze direction 208. In this example, the target position 212 is located in a peripheral area of the SoE space 204. The viewer will perceive this icon 202 in the near peripheral vision without significantly distracting from the viewer's fixation point at the center of gaze 208. The user cannot directly "look at" the target position 212 in the SoE space 204 because it is inherently offset from the center of gaze 208.

FIG. 2 also illustrates a hidden icon 214 outside the SoE space 204. The hidden icon 214 is not actually displayed because it is outside the SoE space 204, and thus outside the projectable image space of the display device 132. The hidden icon 214 may nevertheless exist in memory of the augmented reality system 100. For example, the augmented reality system 100 may store a position and/or appearance characteristics associated with the hidden icon 214 which may be tracked over time even though it is not displayed when its tracked position is outside the SoE space 204.

In an example embodiment, the SoE 206 is about 15 degrees as perceived by the user. This angular width represents a region a larger than the angular extent of the fovea (which is typically about three degrees) and therefore includes a portion of the near peripheral vision. In alternative embodiments, the SoE 206 may be, for example, 5 degrees, 10 degrees, 20 degrees, 25 degrees, or any other configured span. The SoE space 204 does not incorporate the full peripheral vision and thus does not display objects in the far peripheral areas. Despite the SoE 206 being relatively narrow, an approximately 15-degree SoE 206 is generally sufficient to simulate the appearance of wider virtual objects. This is because the human eye has poor peripheral vision outside this span. To compensate, the human vision system controls the eye to rapidly jump between different fixation points to scan an environment. The human vision system can then mentally stitch together these narrow visual snapshots to build a mental map of large areas. This mental image stitching may occur subconsciously without the viewer being directly aware of the underlying anatomical process. Because of this operating mechanism of the human vision system, an augmented reality device 110 that projects objects only within a relatively narrow SoE space 204 can still closely approximate a user's perception of real-world objects without significantly impacting the user experience.

Figure 3:
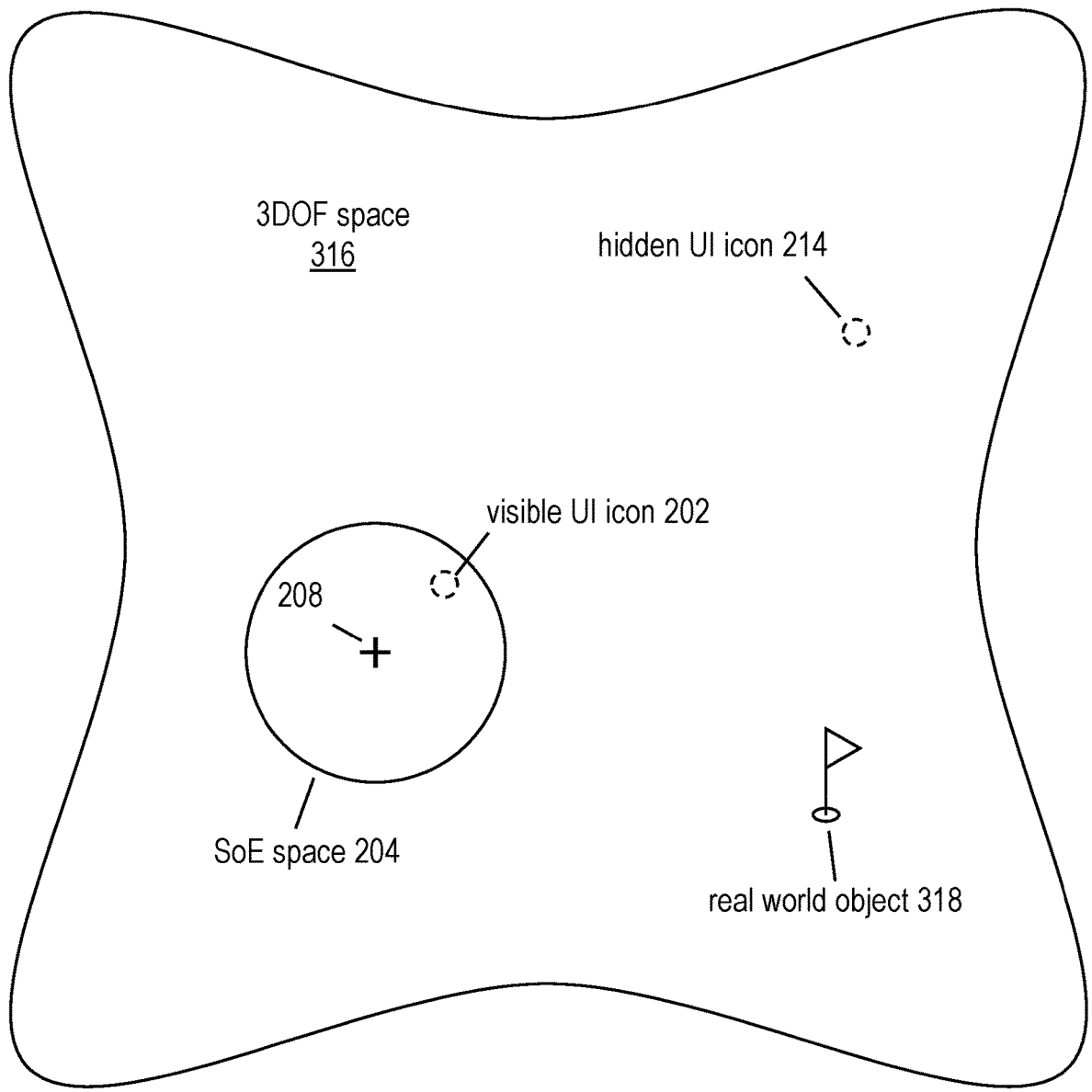
FIG. 3 is a diagram illustrating an SoE space relative to a three degree of freedom (3DOF) space of an augmented reality world view.

FIG. 3 illustrates a 3-degree-of-freedom (3DOF) space 316 representing the range of possible gaze directions 208 for a user with a stable head position. The 3DOF space has three degrees of freedom corresponding to yaw, pitch, and roll of the eye. The 3DOF space does not have translational degrees of freedom, i.e., a translational position of the eye is not a component of its 3DOF position, and a virtual object displayed at a particular 3DOF location will remain at that 3DOF location regardless of translational movements. The 3DOF space 316 may be represented as a sphere (or portion thereof) centered on the user's eye that follows the eye through translational movements but not rotations. Because the SoE space 204 is centered at the gaze direction 208, the SoE space 204 can move around in the 3DOF space 302 as the eye changes orientation and the gaze direction 208 shifts.

FIG. 3 also illustrates a real-world object 318 in the 3DOF space 316 that is physically present in the environment. Stationary real-world objects have a fixed position in the 3DOF space 316 when the head is stable and therefore appear stationary to viewer regardless of changes in eye orientation. To simulate the appearance of a real-world object 318, the augmented reality system 100 may control display of the icon 202 or other virtual objects to behave as simulated world objects in the 3DOF space 316. A stationary simulated world object has a fixed position relative to orientation changes in the 3DOF space 316, just like a real-world object. The augmented reality device 110 displays the simulated world object only when the SoE space 204 overlaps with its position in the 3DOF space 316. As the gaze direction 208 and SoE space 204 move across the 3DOF position of a simulated world object, the augmented reality device 110 updates the display in the SoE space 204 to simulate the appearance of a real-world object. For example, if the gaze direction 208 moves from left to right across the position of the simulated world object, the position of the simulated world object is updated to move from right to left across the SoE space 204. When the simulated world object is outside the SoE space 204, it is not displayed but its visual characteristics and position in the 3DOF space 316 may continue to be maintained in memory.

Simulated world objects can also include moving objects. To simulate a moving world object, the augmented reality device 110 displays the simulated world object at the appropriate position in the SoE space 204 when its tracked position in the 3DOF space 316 overlaps with the SoE space 204, thus mimicking the perceived behavior of a real-world object 318 moving according to the same motion pattern.

A simulated world object may be perceived differently than a real-world object in a few respects. First, a simulated world object is only displayed and therefore is only perceived when the SoE space 204 overlaps with its simulated position in the 3DOF space 316. Unlike real-world objects, a simulated world object will not be visible (because it is not displayable) in the far peripheral vision outside the range of the SoE space 204. Nevertheless, for the reasons described above, this difference does not significantly impact the user's perception of the virtual objects.

Second, in an augmented reality device 110 that tracks only changes in eye orientation without sensing translational movement, appearance of a simulated world object will differ from a real-world object 318 during translational movements of the eye (e.g., when the user's head position is not stable). Unlike a stationary real-world object 318, a simulated world object will appear to follow the user through translational movements because it moves with the SoE space 204.

The icon 202 or other virtual objects may be controlled like simulated world objects under some situations or may be controlled differently in other situations. For example, in some instances, it may be desirable for a virtual object to track the user's gaze direction 208 (by maintaining the object at the same position in the SoE space 204) regardless of where the gaze direction 208 moves in the 3DOF space 316.

Figure 4A:
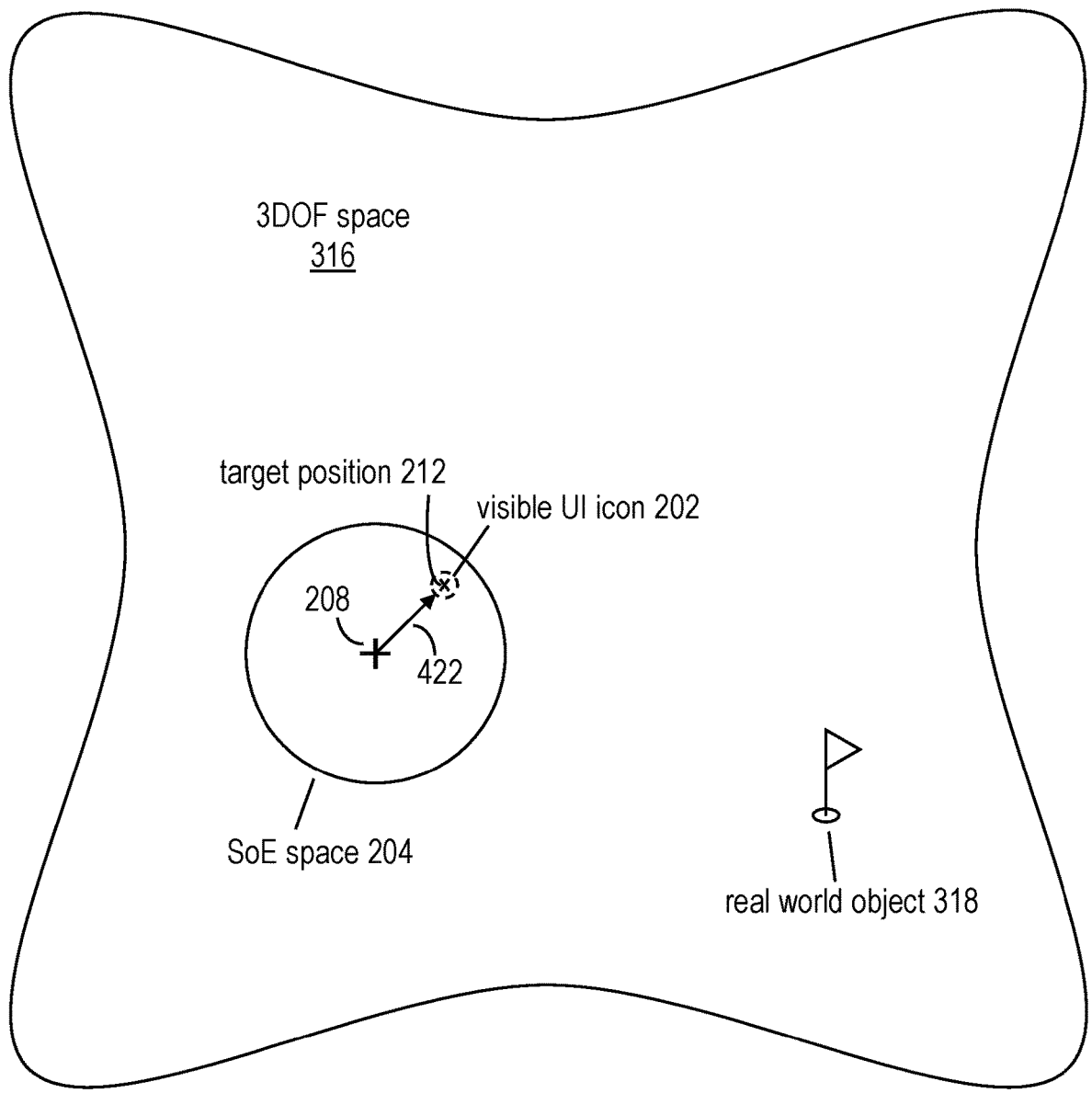
FIG. 4A is a diagram illustrating an eye movement associated with selecting an icon.
Figure 4B:
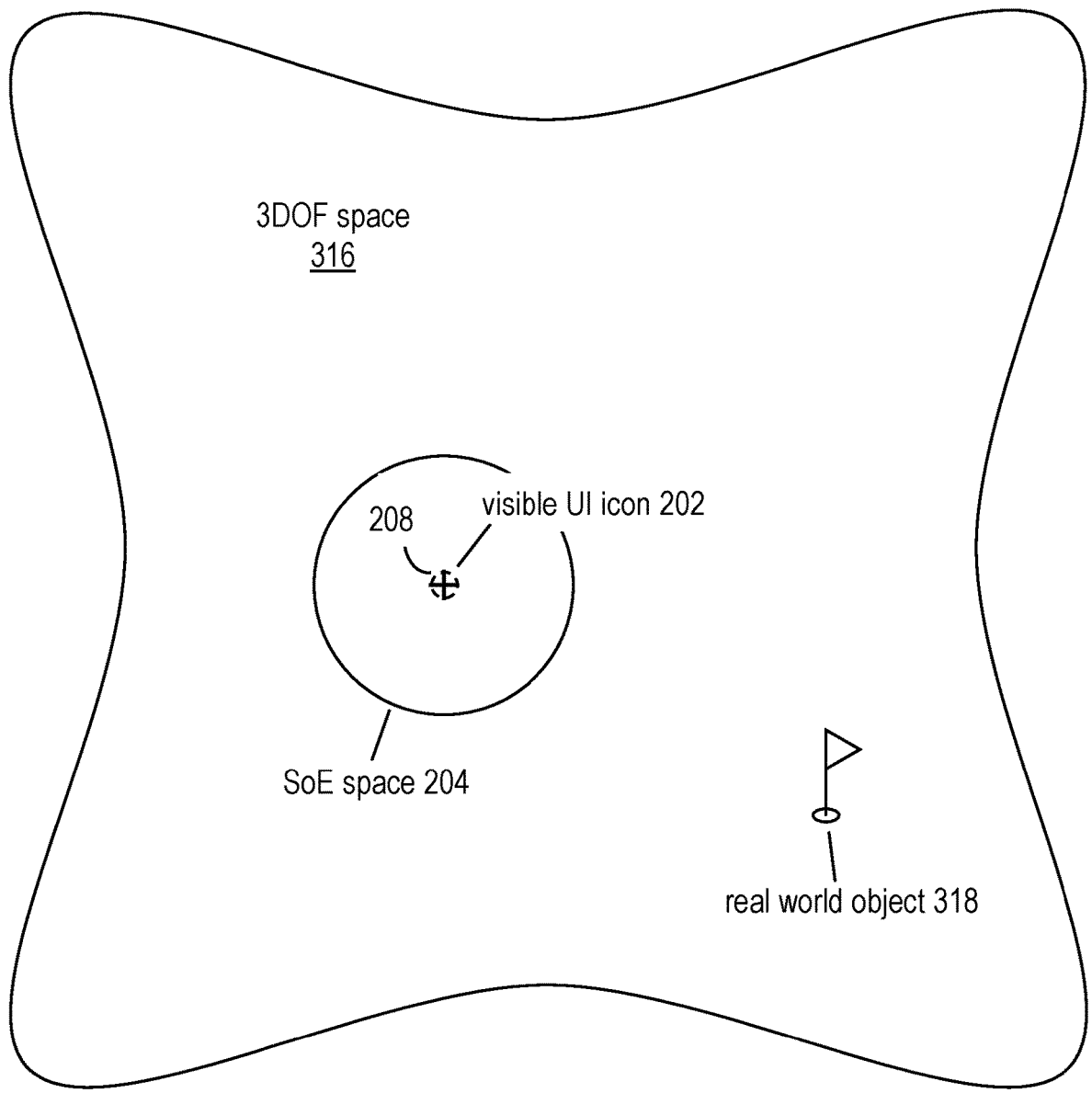
FIG. 4B is a diagram illustrating a result of selecting the icon.

FIGS. 4A-B illustrate an example technique for controlling behavior of an icon 202 in an augmented reality system 100 when the user attempts to look at the icon 202 (e.g., to "select" the icon). As shown in FIG. 4A, the icon 202 is initially displayed at a target position 212 in the SoE space 204 at fixed offset from the center of gaze 208. The target position 212 is in an annular region in the peripheral area of the SoE space 204 outside the fovea such that it appears in the user's near peripheral vision.

Prior to completing the eye movement indicated by the arrow 422, the augmented reality device 110 display device may control the icon 202 to behave like a stationary simulated world object as the gaze direction 208 changes. From the viewer's perspective, the icon 202 does not move in the user's world view, i.e., it maintains its position in the 3DOF space 316. In practice, the augmented reality system 100 simulates this effect by updating the location of the icon 202 in the SoE space 204 to compensate for the detected change in gaze direction 208.

The user may interact with the icon 202 (e.g., select it) by adjusting the gaze direction 208 to the perceived location of the icon 202 in the 3DOF space 316 (or within a predefined area around it) as indicated by the arrow 422. This movement corresponds to the user changing the gaze direction 208 by an amount and direction within an error range of the offset between the center of gaze 208 and the target position 212. By tracking the icon location as described above, the augmented reality system 100 may detect the selection when the tracked icon location is within a predefined area around the center of gaze 208. The resulting locations of the gaze direction 208 and SoE space 204 are illustrated in FIG. 4B.

The augmented reality system 100 may initiate different actions in response to detecting selection of the icon 202. In one embodiment, once the icon 202 is selected, it may become temporarily locked to the center of gaze 208. Subsequently, the augmented reality system 100 controls display of the icon 202 to track the gaze direction 208 as the eye orientation changes such that the icon 202 is continuously displayed at the center of the SoE space 204. In further embodiments, the augmented reality system 100 may apply a visual effect to the icon 202 indicative of the selection such as changing its color, size, form, visual effects, or other appearance change. After a specified time period, the augmented reality system 100 may remove the icon 202 from display, reposition to the target position 212, or initiate another action.

Figure 5A:
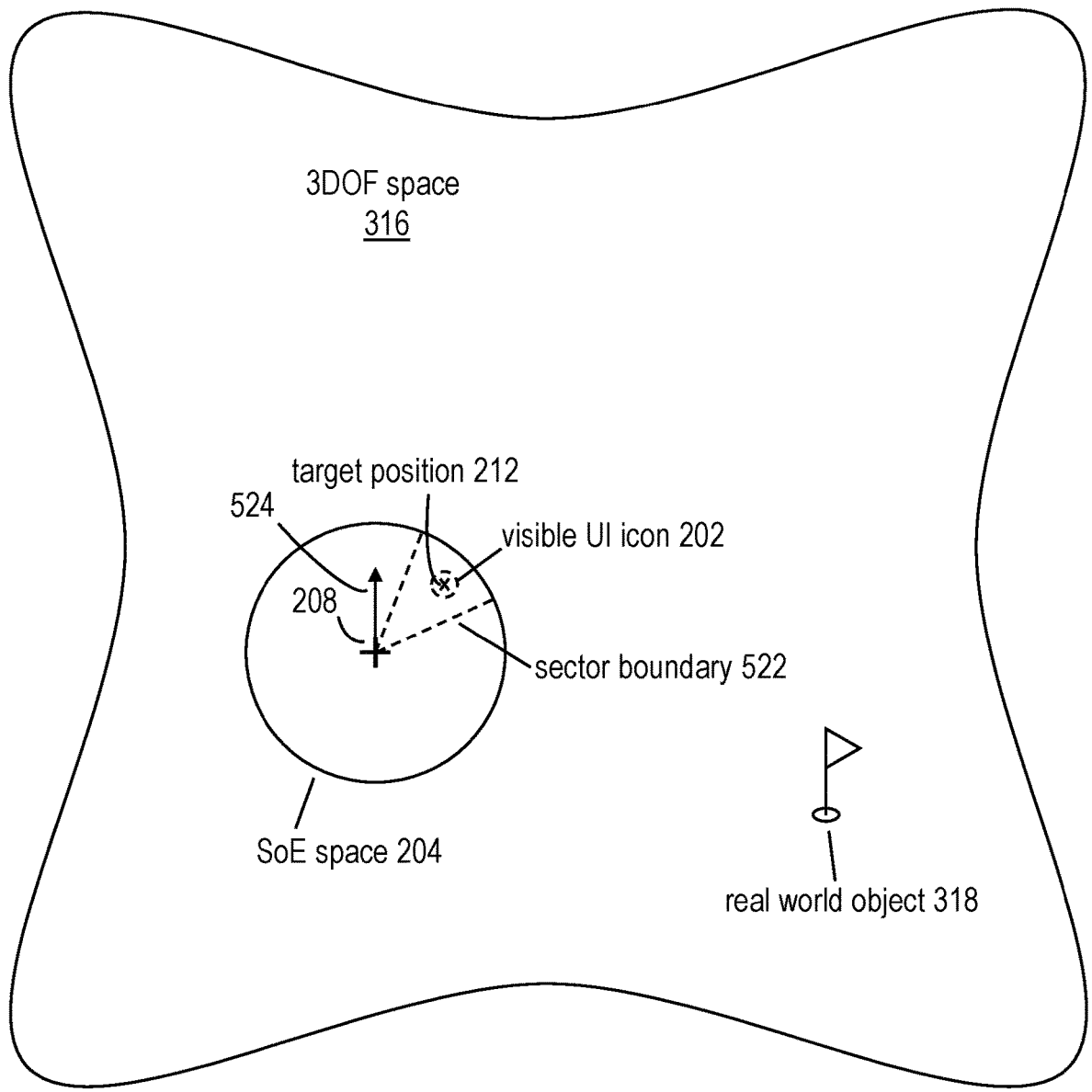
FIG. 5A is a diagram illustrating a first step in a process for repositioning an icon to a target position according to first repositioning criteria.
Figure 5B:
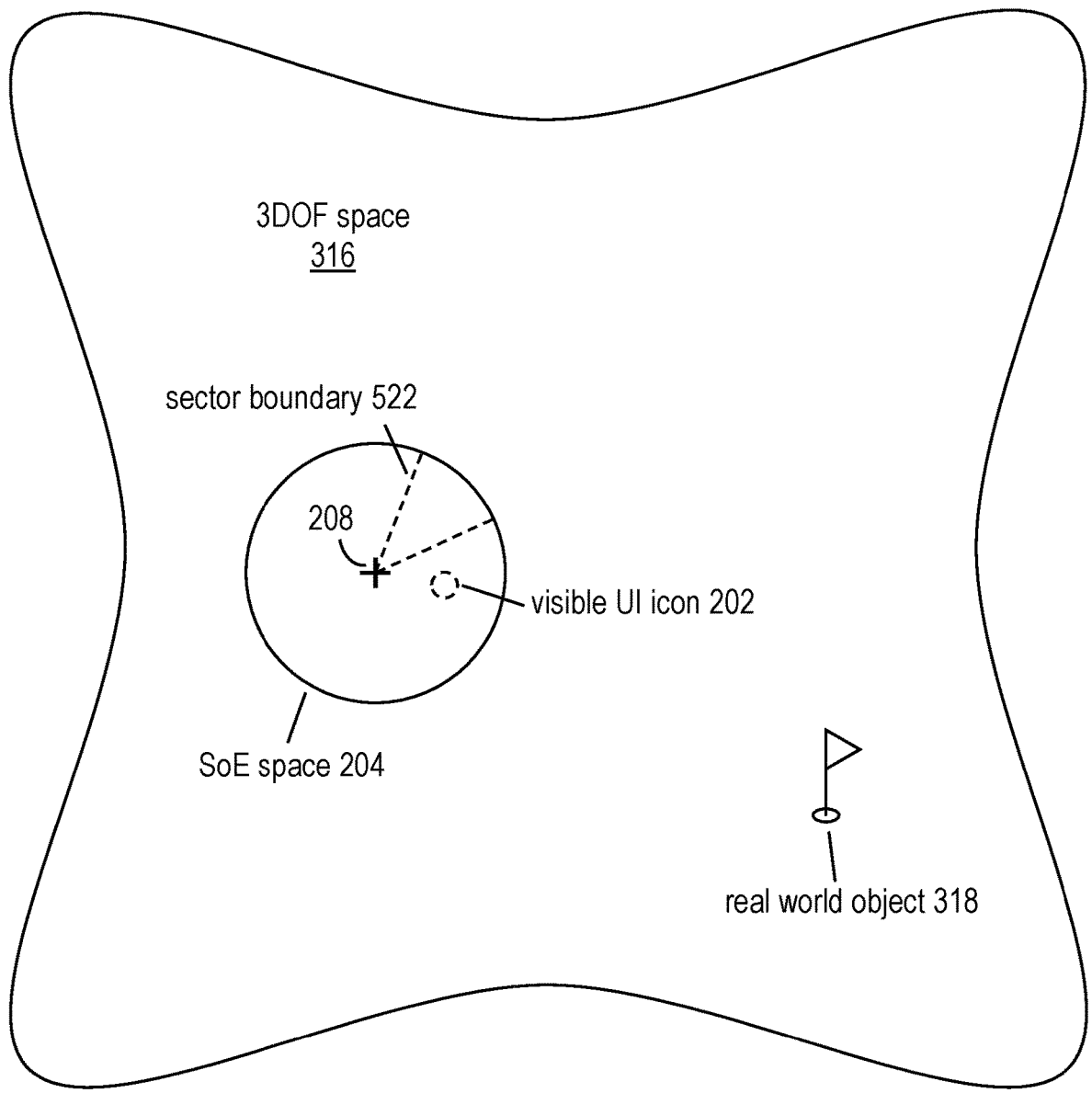
FIG. 5B is a diagram illustrating a second step in a process for repositioning an icon to a target position according to the first repositioning criteria.
Figure 5C:
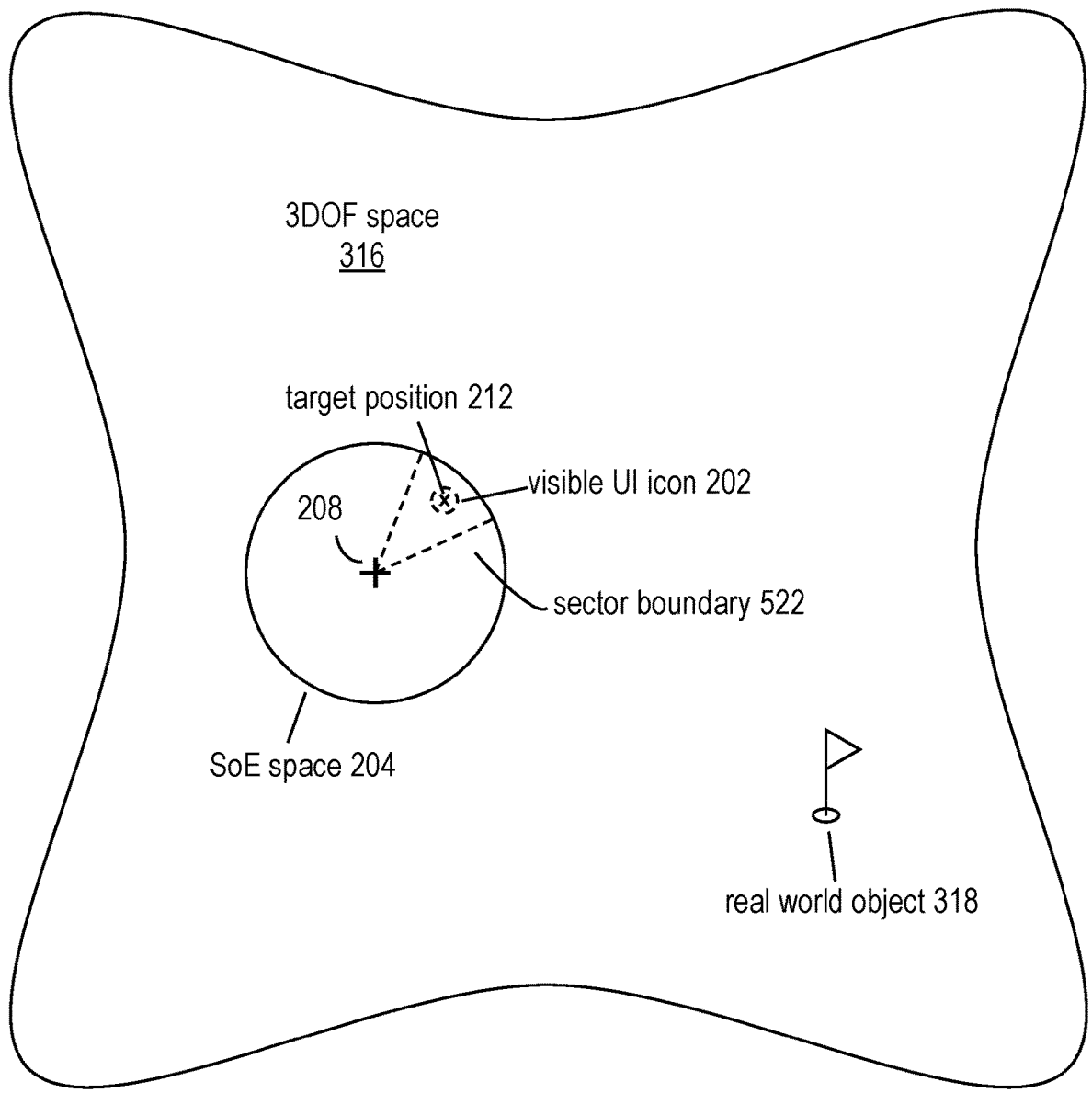
FIG. 5C is a diagram illustrating a third step in a process for repositioning an icon to a target position according to the first repositioning criteria.

FIGS. 5-7 illustrate various techniques for repositioning the icon 202 to the target position 212 when the user looks away from the icon 202. FIGS. 5A-C illustrate a first example technique for repositioning an icon 202 to the initial target position 212. As illustrated in FIG. 5A, the icon 202 starts at the initial target position 212 at a predefined offset from the center of gaze 208. The sector boundary lines 522 define an area (e.g., a wedge) that include an angular range of the SoE space 204 around the angle from the center of gaze 208 to the target position 212. The augmented reality system 100 controls the icon 202 like a stationary simulated world object when its tracked position is within the sector boundaries 522 such that its position is stable in the 3DOF space 316.

The arrow 524 indicates a change in the gaze direction 208 that is outside the sector boundaries 522. FIG. 5B illustrates the updated gaze direction 208 and the new position of the SoE space 204 in the 3DOF space 216 after the shift in gaze direction represented by the arrow 524. In the updated SoE space 204, the icon 202 is outside the sector boundaries 522. The augmented reality system 100 detects when the icon 202 is outside the sector boundaries 522 and initiates a repositioning sequence to reposition the icon 202 back to its target position 212 in the SoE space 204. The result of the repositioning sequence is illustrated in FIG. 5C. Here, the icon 202 is now redisplayed at the target position 212 in the SoE space 204 at the predefined offset from the updated gaze direction 208.

The specific timing of when to initiate the repositioning sequence may be implemented in various ways. In an embodiment, the augmented reality system 100 periodically applies repositioning criteria and initiates the repositioning sequence when the criteria are met. For example, in the example of FIGS. 5A-C, the repositioning criteria may include detecting that the icon 202 is outside the sector boundary 522. Alternatively, the repositioning may be initiated only when the icon 202 is both outside the sector boundaries 522 and when the eye meets predefined stability criteria (e.g., a tracked angular velocity of the eye remains below a predefined velocity threshold for at least a predefined time period).

Once initiated, the repositioning sequence may be implemented in various ways. In an embodiment, the repositioning sequence involves first removing the icon 202 (e.g., via a fade, dissolve, cut, or other transition effect) and then redisplaying the icon 202 at the target position 212. The redisplay may be performed according to various transition effects such as a fade, dissolve, cut, or other transition effect. In an embodiment, rather than immediately redisplaying the icon 202, the augmented reality system 100 may wait until predefined redisplay criteria is met such as, for example, detecting when the eye is substantially stable.

Figure 6A:
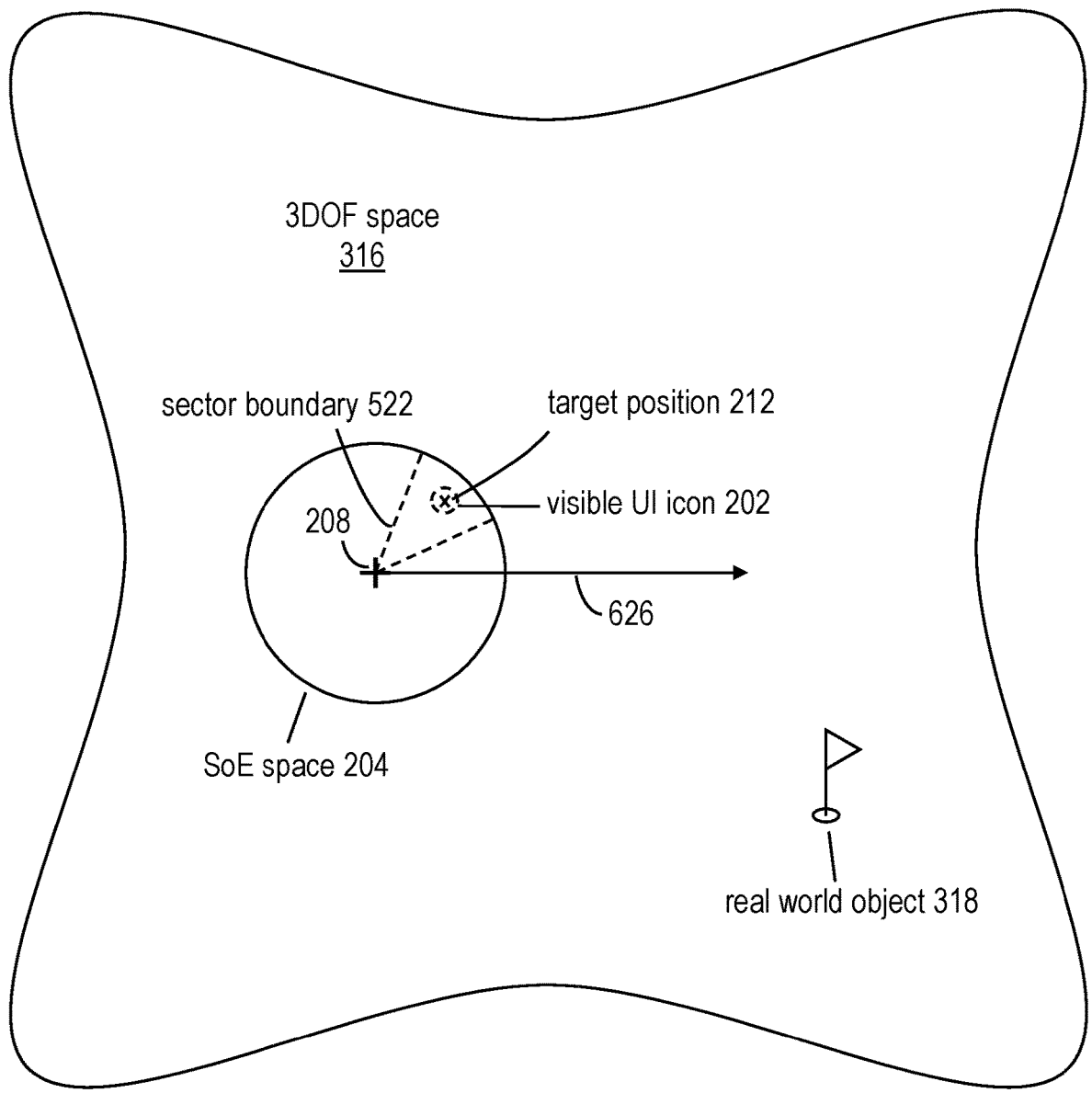
FIG. 6A is a diagram illustrating a first step in a process for repositioning an icon to a target position according to second repositioning criteria.
Figure 6B:
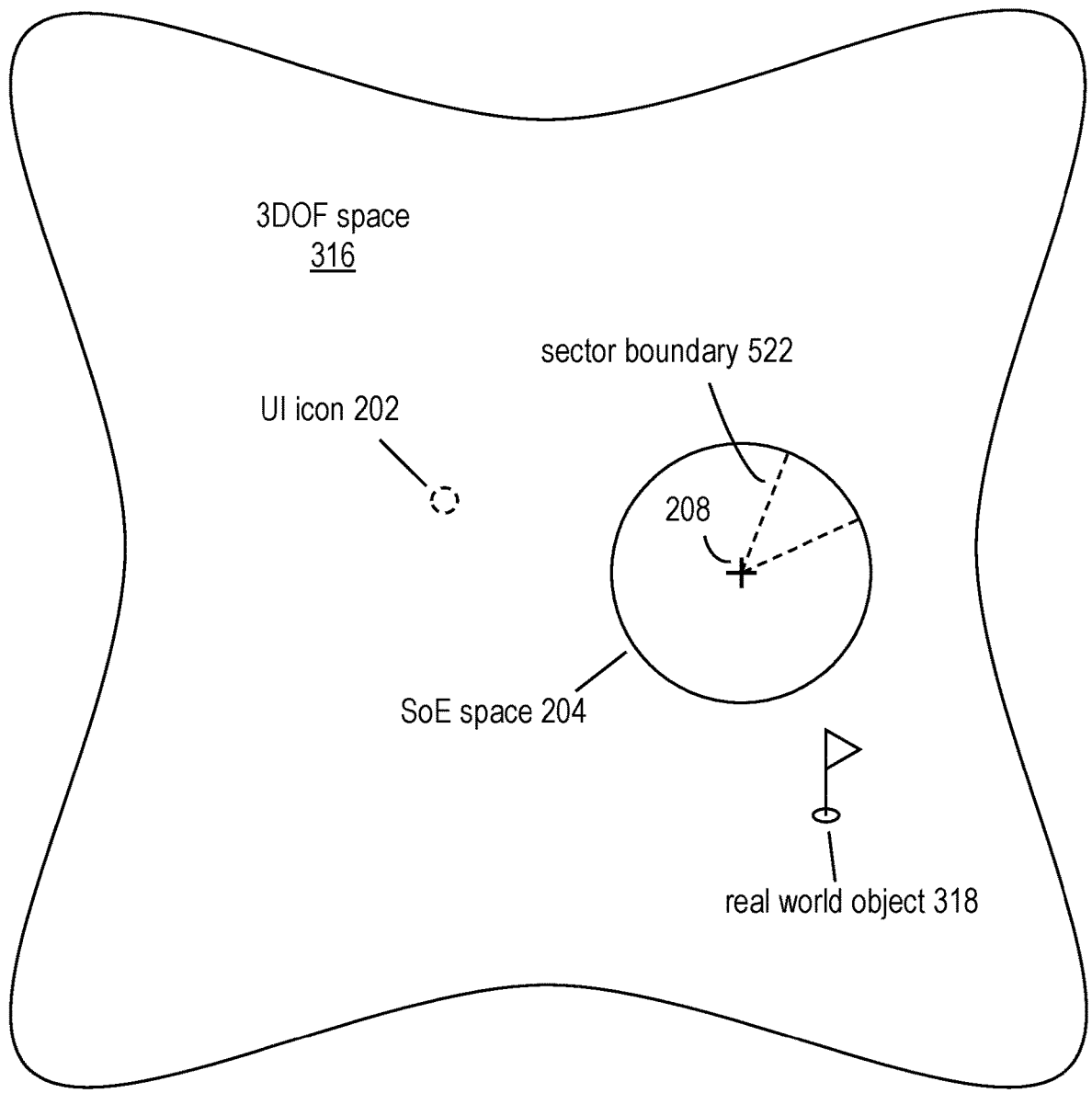
FIG. 6B is a diagram illustrating a second step in a process for repositioning an icon to a target position according to second repositioning criteria.
Figure 6C:
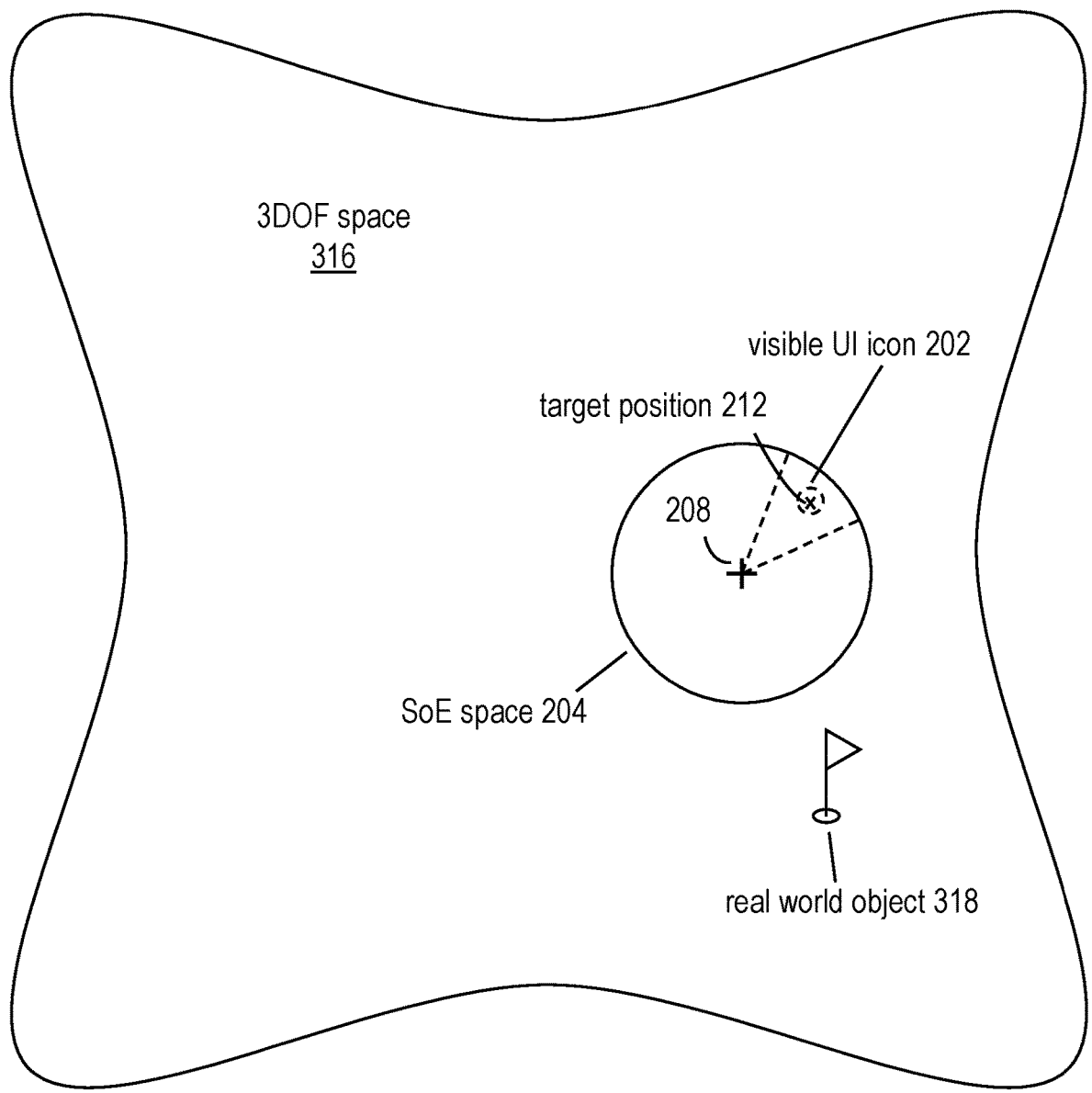
FIG. 6C is a diagram illustrating a third step in a process for repositioning an icon to a target position according to second repositioning criteria.

FIGS. 6A-C illustrate another example technique for repositioning an icon 202 to the initial target position 212. In FIG. 6A, the icon 202 is displayed at the initial target position 212 at the predefined offset from the center of gaze 208. The arrow 626 indicates a change in the gaze direction 208 that comprises a large shift to the right in the 3DOF space 316. FIG. 6B illustrates the updated gaze direction 208 and the new position of the SoE space 204 in the 3DOF space 316. Under this relatively large shift, the tracked position of the icon 202 in the 3DOF space 316 moves outside the SoE space 204 and therefore cannot be displayed. In this example, the repositioning sequence may be initiated once the tracked icon position 202 is outside the SoE space 204. The icon 202 may be redisplayed to the target position 212 using any of the transition effects described above. In FIG. 6C, the icon 202 is repositioned to the target position 212 associated with the updated gaze direction 208 and SoE space 204.

Figure 7A:
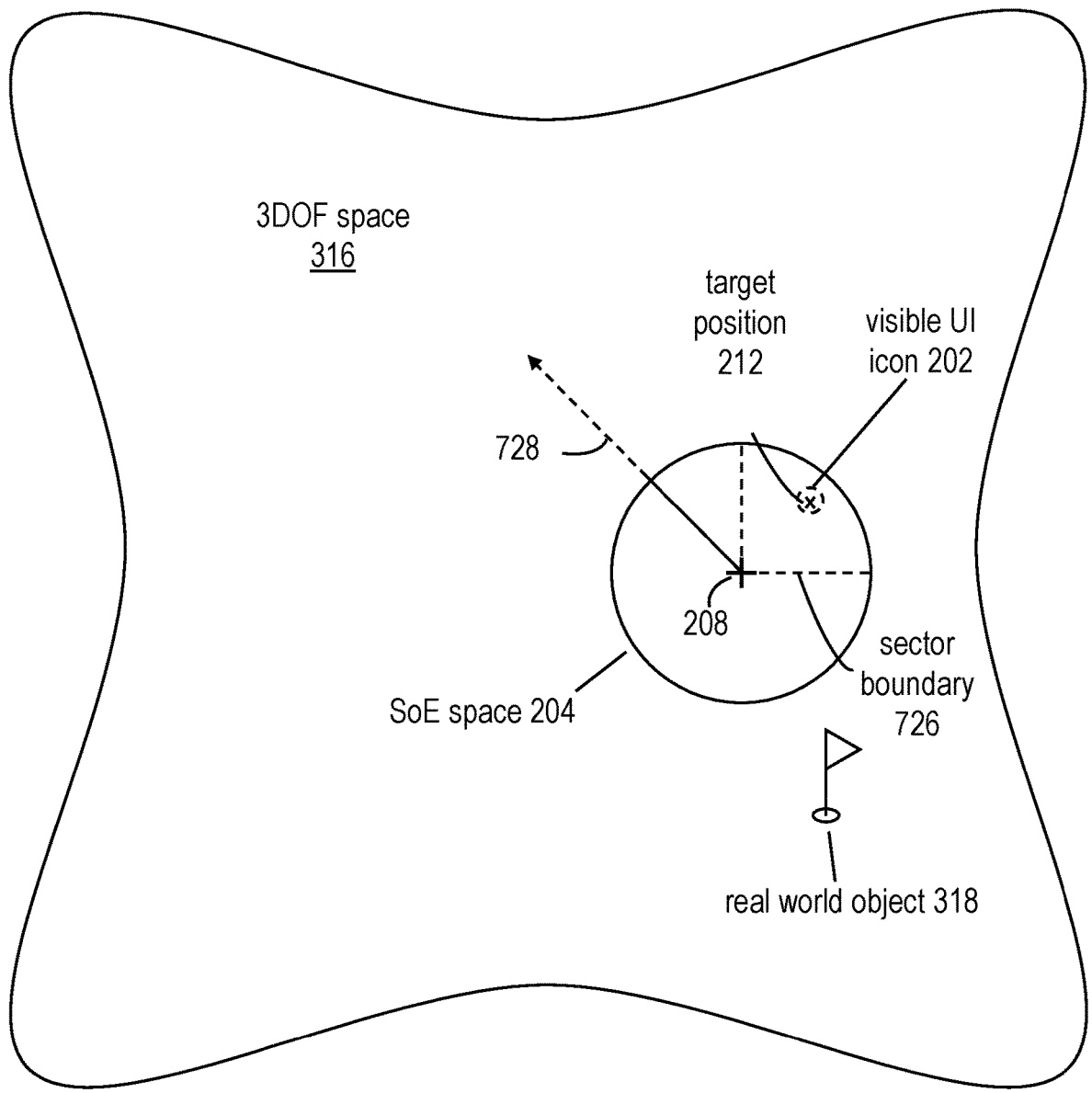
FIG. 7A is a diagram illustrating a first step in a process for repositioning an icon to a target position according to third repositioning criteria.
Figure 7B:
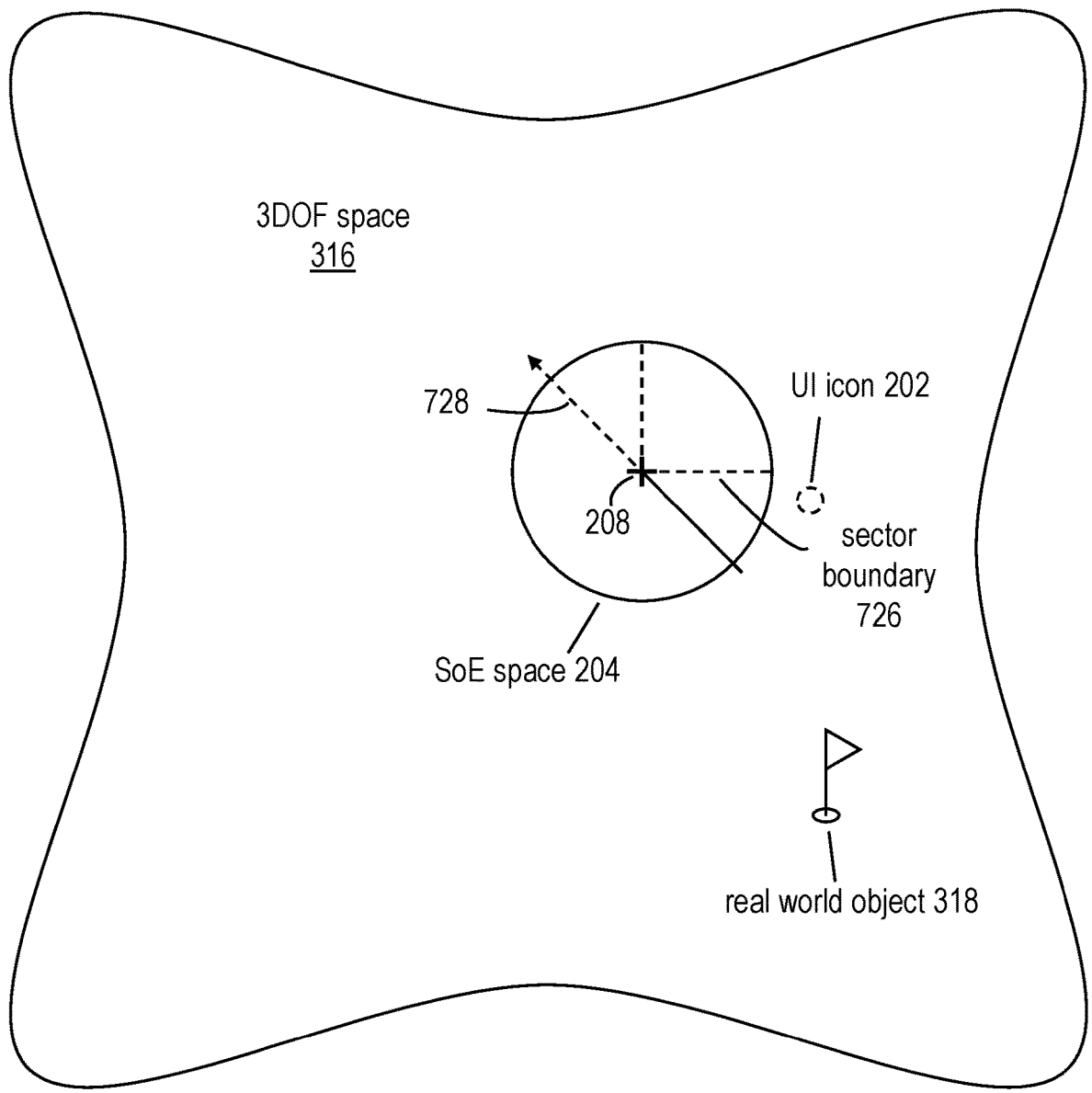
FIG. 7B is a diagram illustrating a second step in a process for repositioning an icon to a target position according to the third repositioning criteria.
Figure 7C:
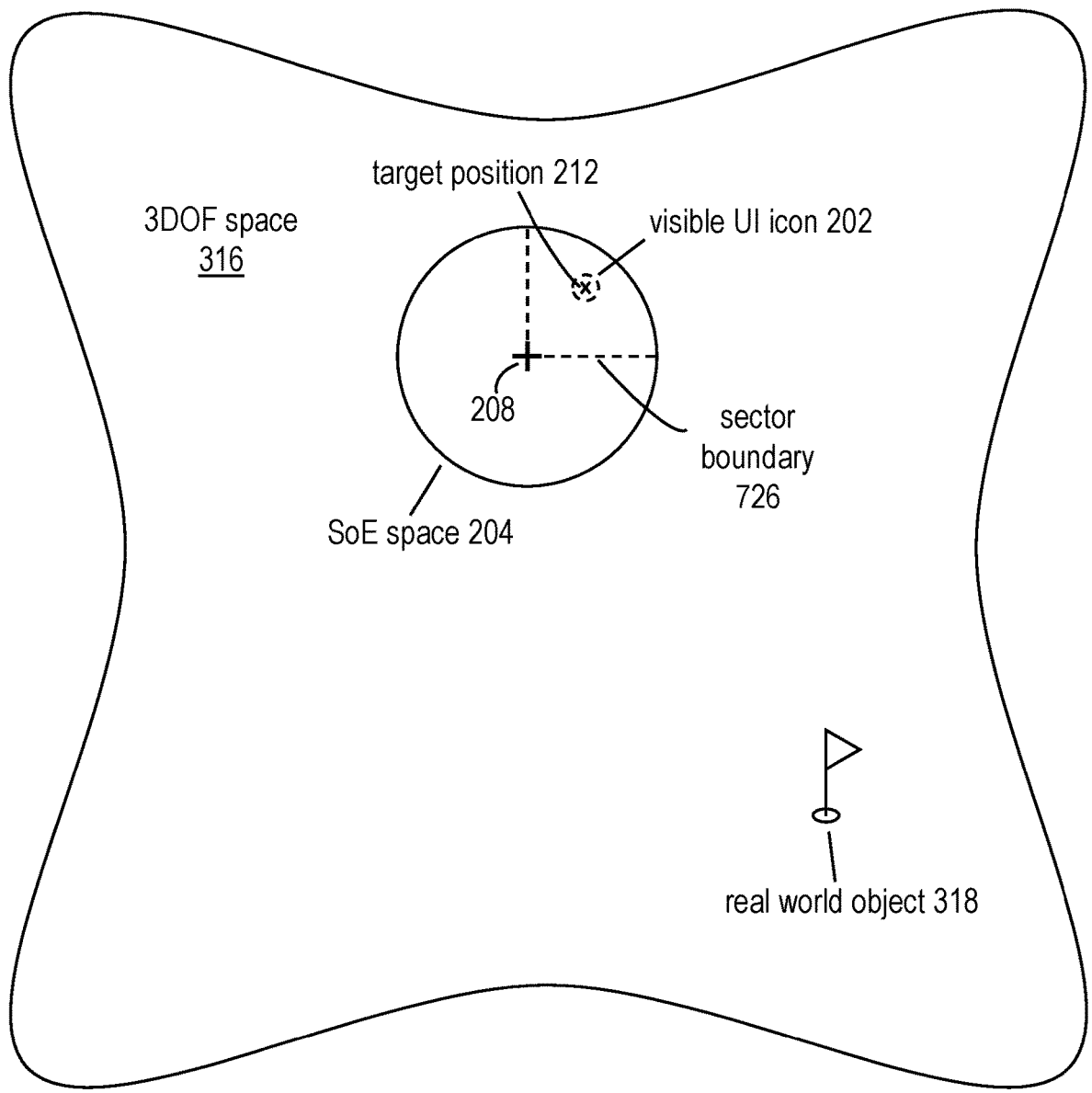
FIG. 7C is a diagram illustrating a third step in a process for repositioning an icon to a target position according to the third repositioning criteria.

FIGS. 7A-C illustrate another example technique for repositioning an icon 202 to the initial target position 212. In FIG. 7A, the icon 202 starts at the initial target position 212 at a predefined offset from the center of gaze 208. The sector boundary lines 726 define an area (e.g., a wedge) of the SoE space 204 that includes an angular range around the angle from the center of gaze 208 to the target position 212. Here, the sector boundaries 726 may be wider than the sector boundaries 522 defined in FIG. 5A. The arrow 728 indicates a saccade having the magnitude and direction shown. Based on known anatomical constraints on eye movements, the augmented reality system 100 can estimate, prior to the saccade completing, the final gaze direction at the end of the saccade. In this example, the solid portion of the arrow 728 represents the portion of the saccade that occurs before the augmented reality system 100 estimates the end position of the saccade, while the dashed portion of the arrow 728 represents the portion of the saccade that occurs after the augmented reality system 100 estimates the end position.

The augmented reality system 100 may initiate a repositioning sequence when a saccade is detected and the predicted position of the icon 202 at the end of the saccade is outside the boundary lines 726. FIG. 7B illustrates the instantaneous positions of the gaze direction 208 and SoE space 204 in the 3DOF space 316 when the end point can be predicted. FIG. 7C indicates the resulting positions of the gaze direction 208 and SoE space 204 in the 3DOF space 316 after the saccade completes and also illustrates the icon 202 repositioned to the target position 212. The icon 202 may be repositioned to the target position 212 using any of the transition effects described above.

In other embodiments, different or additional repositioning criteria may be applied to determine when to initiate a repositioning sequence. For example, in an embodiment, a stability-based repositioning criteria may be applied in which the repositioning sequence is initiated whenever the angular velocity of the eye drops below a predefined threshold for at least a minimum time period (i.e., stability criteria is met) regardless of the icon's tracked position. Transition effects may optionally be applied when removing and redisplaying the icon 202.

The augmented reality system 100 may apply any of the above-described repositioning techniques individually or may apply two or more different techniques in parallel. For example, the augmented reality system 100 may identify when any one of a set of different repositioning criteria are met, and initiate the repositioning criteria in response to any of the criteria being met.

In an embodiment, the augmented reality system 100 may selectively instantiate or remove the icon 202 dependent on various factors. For example, in one embodiment, the icon 202 is instantiated responsive to the augmented reality system 100 detecting that a notification is available for the user. The augmented reality system 100 may control the icon 202 to behave as described above, i.e., by initially presenting the icon 202 at a target position 212 in the SoE space 316, tracking position of the icon 202 in the 3DOF space 316 as the gaze direction 208 changes, repositioning the icon 202 to the target position 212 when repositioning criteria is met, and initiating a selection of the icon 202 when selection criteria is met. Responsive to selection, the augmented reality system 100 may initiate a presentation of the notification (e.g., visually or audibly).

In another example, the icon 202 may be utilized as an open button that when selected, causes a user interface menu to be displayed. In another example, the icon 202 may be utilized as a close button that appears in conjunction with another user interface and causes the user interface to close (e.g., be removed from display) when selected.

Figure 8A:
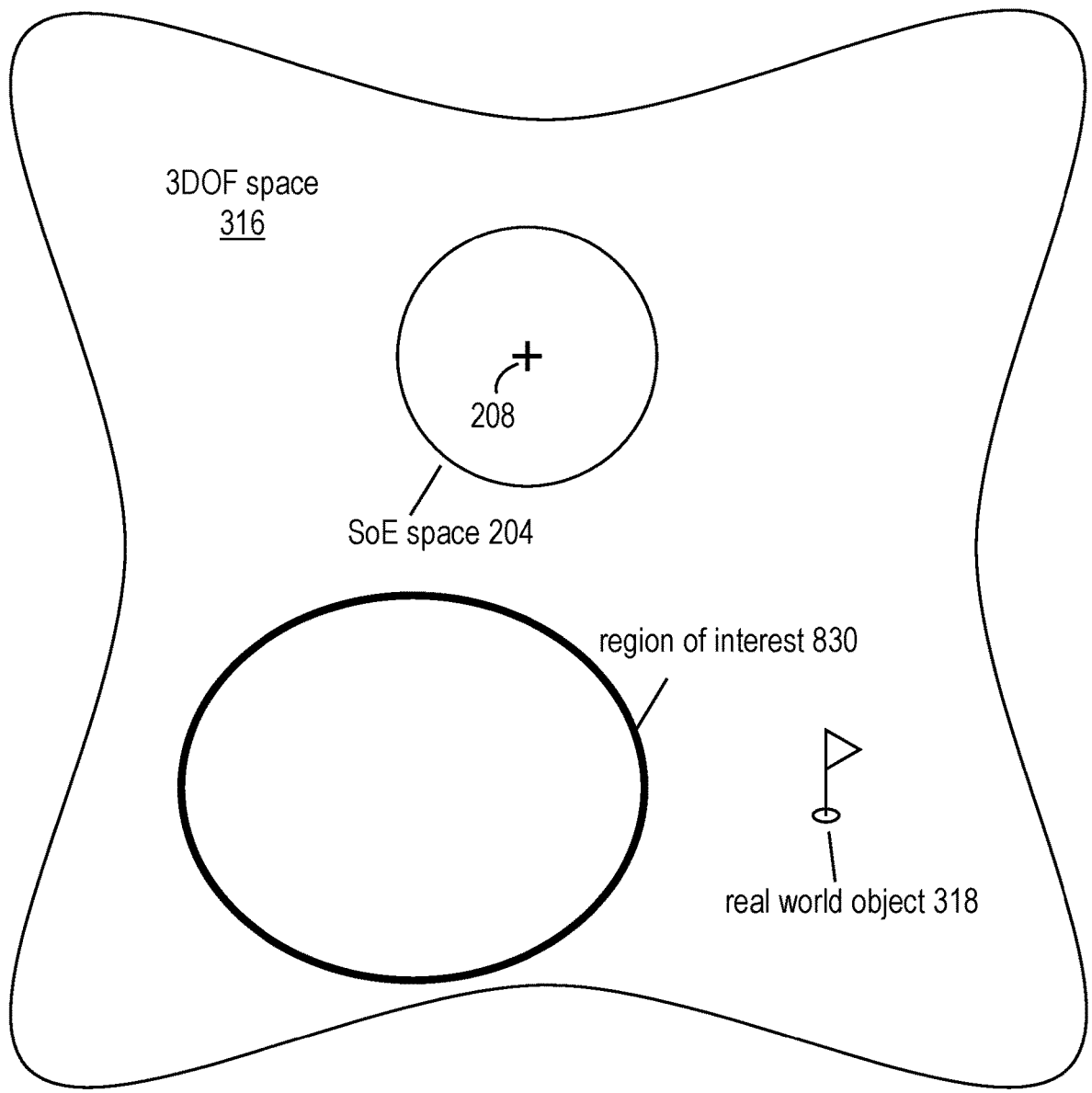
FIG. 8A is a diagram illustrating a first aspect of a technique for changing behavior of an icon based on a gaze direction relative to a region of interest.
Figure 8B:
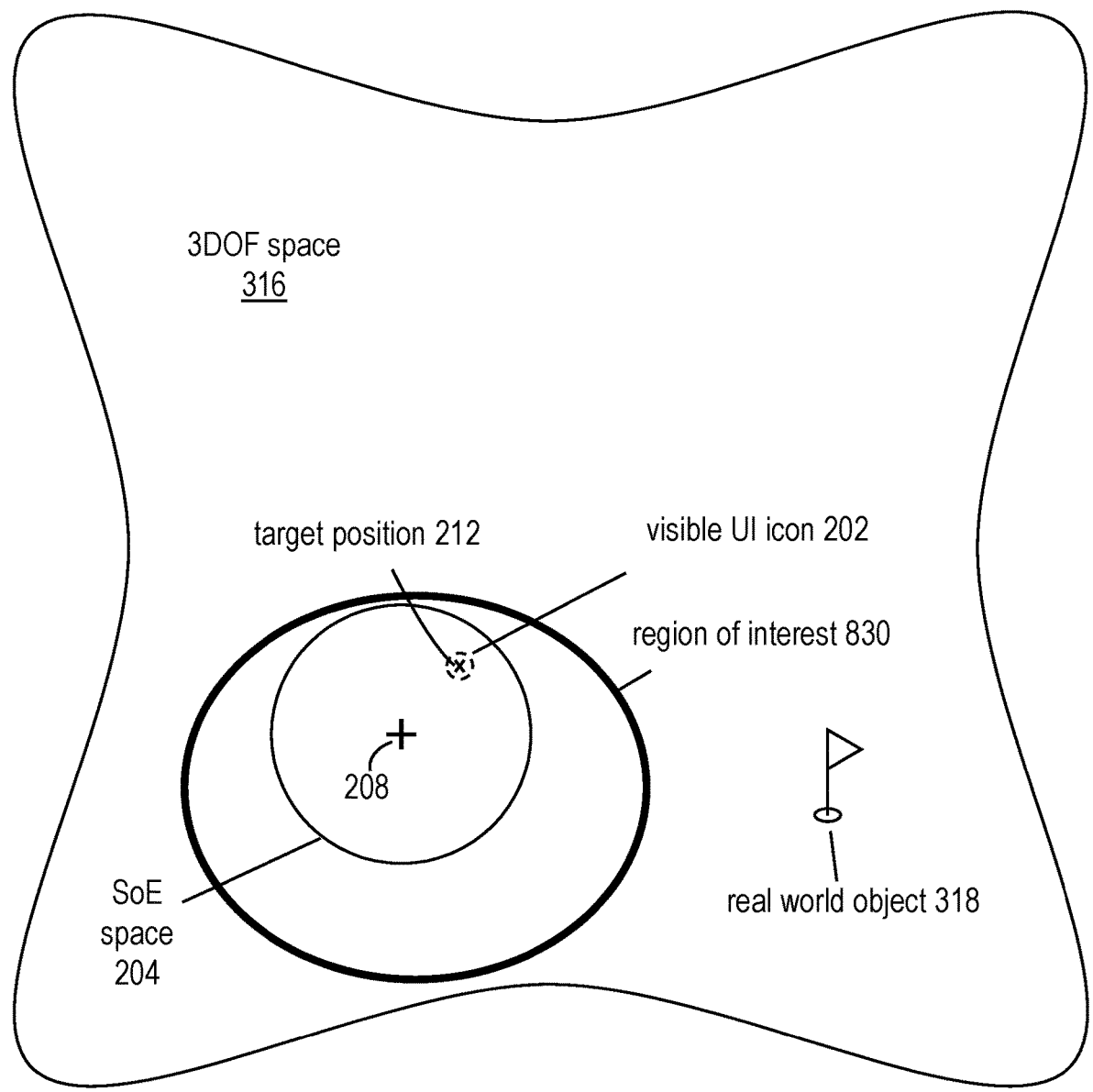
FIG. 8B is a diagram illustrating a second aspect of a technique for changing behavior of an icon based on a gaze direction relative to a region of interest.

In further embodiments, the augmented reality system 100 selectively instantiates the icon 202 dependent on the user's gaze direction. For example, as illustrated in FIG. 8A, a region of interest 830 in the world view (e.g., the 3DOF space 316) may be associated with the icon 202. This region of interest 830 may correspond to, for example, a region where an interactive simulated or real-world object is present, or it may comprise any arbitrarily assigned region. In FIG. 8A, the gaze direction 208 is outside the region of interest 830 and the icon 202 is not displayed. In FIG. 8B, the gaze direction 208 moves within the region of interest 830. In response, the augmented reality system 100 instantiates the icon 202 to its initial target position 212 in the SoE space 204. While the gaze direction 208 remains within the region of interest 830, the augmented reality system 100 may control the icon 202 to behave as described above. Selection of the icon 202 may initiate a function associated with the region such as, for example, selecting the object depicted in the region. When the gaze direction 208 exits the region, the augmented reality system 100 may automatically remove the icon 202.

In further embodiments, different repositioning criteria for a displayed icon 202 may be applied dependent on whether or not the gaze direction 208 is within a region of interest 830 in the 3DOF space 316. For example, in an embodiment, the augmented reality system 100 may apply first repositioning criteria (e.g., the combination of any of the criteria described in FIGS. 5-7) when the gaze direction 208 is outside the region of interest 830. When the gaze direction 208 is inside the region of interest 802, the augmented reality system 100 may instead apply a second (different) reposition criteria (e.g., only the stability-based repositioning criteria described above).

Figure 9:
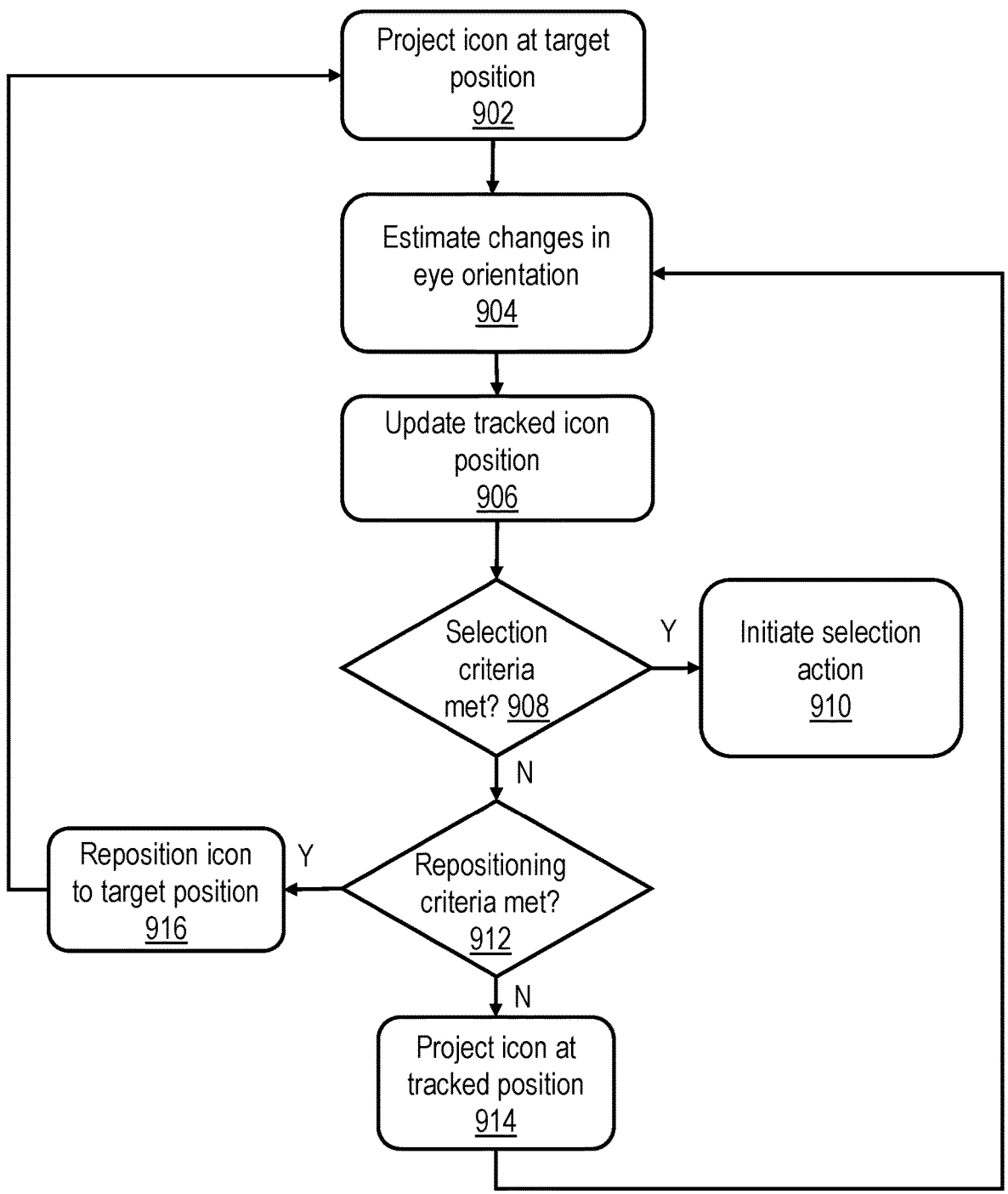
FIG. 9 is a flowchart illustrating an example embodiment of a process for managing display of an icon in an eye tracking augmented reality device.

FIG. 9 is a flowchart illustrating an example embodiment of a process for managing display of an icon in an augmented reality system 100. The augmented reality system 100 initially projects 902 the icon onto a retina of an eye such that the icon appears at a target position 212 located at a predefined offset from a center of gaze 208 outside the fovea. The augmented reality system 100 estimates 904 changes in eye orientation and updates 906 a tracked position of the icon 202 such that the icon 202 maintains a substantially stable appearance with respect to the world view (i.e., its position is maintained in the 3DOF space 316). The augmented reality system 100 determines 908 if selection criteria is met (e.g., the tracked position is within a predefined selection region within a threshold distance from the center of gaze 208). If the selection criteria is met, a selection action may be initiated 910. For example, the selection action may include changing an appearance characteristic of the icon 202, causing the icon 202 to temporarily lock to the center of gaze 208, displaying a message associated with the icon 202, initiating a navigation action associated with the user interface, or performing another action or combination of actions associated with operation of the augmented reality system 100. Otherwise, the augmented reality system 100 detects 912 if repositioning criteria are met based on the tracked position. The repositioning criteria may comprise any of the criteria described above or a combination thereof. For example, the repositioning criteria could include (a) detecting that the tracked position is outside a predefined region around the target position 212 (e.g., as shown in FIGS. 5A-C); (b) detecting that the tracked position is outside the projectable image space (i.e., SoE space 204) of the display (e.g., as shown in FIGS. 6A-C); (c) detecting a saccade having a predicted magnitude and direction that will result in the tracked position of the icon 202 falling outside a predefined region around the target position 212 (e.g., as shown in FIGS. 7A-C); (d) detecting that an angular velocity of the eye is below a predefined angular velocity threshold; or (e) any combination thereof. If the repositioning criteria are not met, the augmented reality system 100 projects 914 the icon 202 at the tracked position whenever the tracked position is within the projectable image space (i.e., within the SoE space 204) of the augmented reality system 100 and the process continues to track changes in eye orientation. If the repositioning criteria is met, the augmented reality system 100 repositions 916 the icon 202 to the target position 212 and the process restarts. Repositioning may comprise removing the icon 202, detecting when changes in orientation of the eye meet stability criteria, and re-displaying the icon 202 at the target position 212 responsive the stability criteria being satisfied. In an embodiment, the process of FIG. 9 may be executed periodically at a frame rate sufficient to simulate appearance of a real-world object (e.g., 60 frames per second or 120 frames per second). Alternatively, different steps may be performed at different frequencies. For example, the changes in eye orientation may be estimated at a rate higher than the frame rate. In addition, detection of the selection criteria and/or repositioning criteria may be checked less frequently than frame rate for updating the tracked position and displaying the icon.

Figure 10A:
FIG. 10A shows a user wearing an electronic contact lens.
Figure 10B:
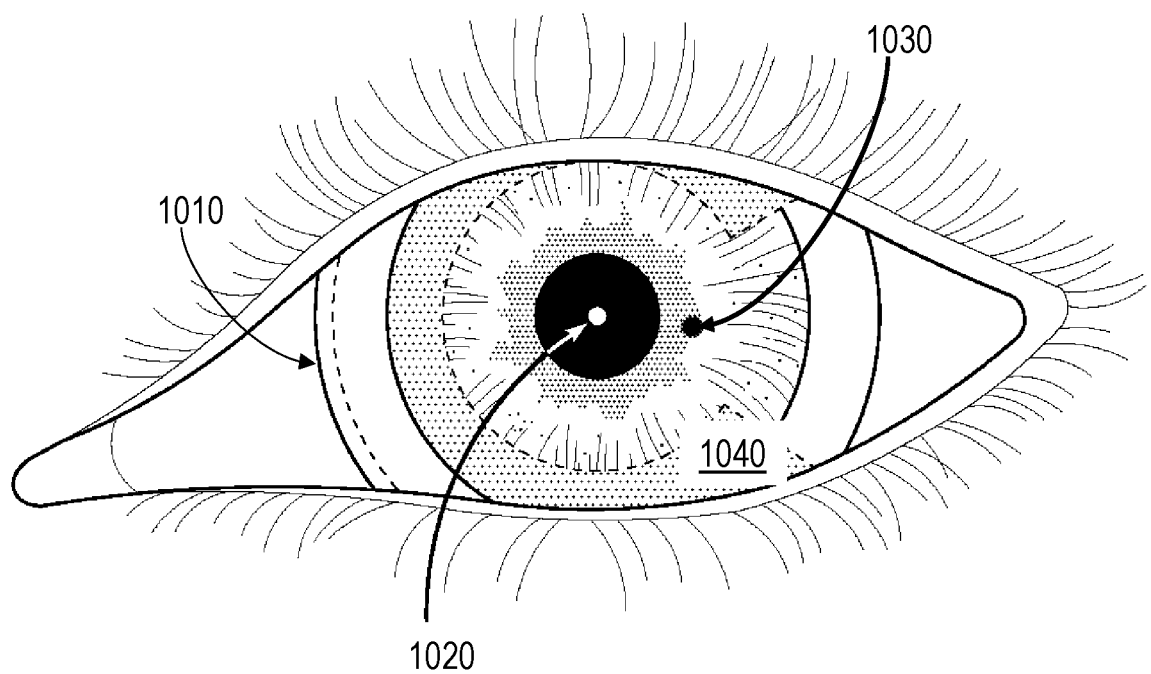
FIG. 10B shows a magnified and simplified view of the electronic contact lens mounted on the user's eye.
Figure 10C:
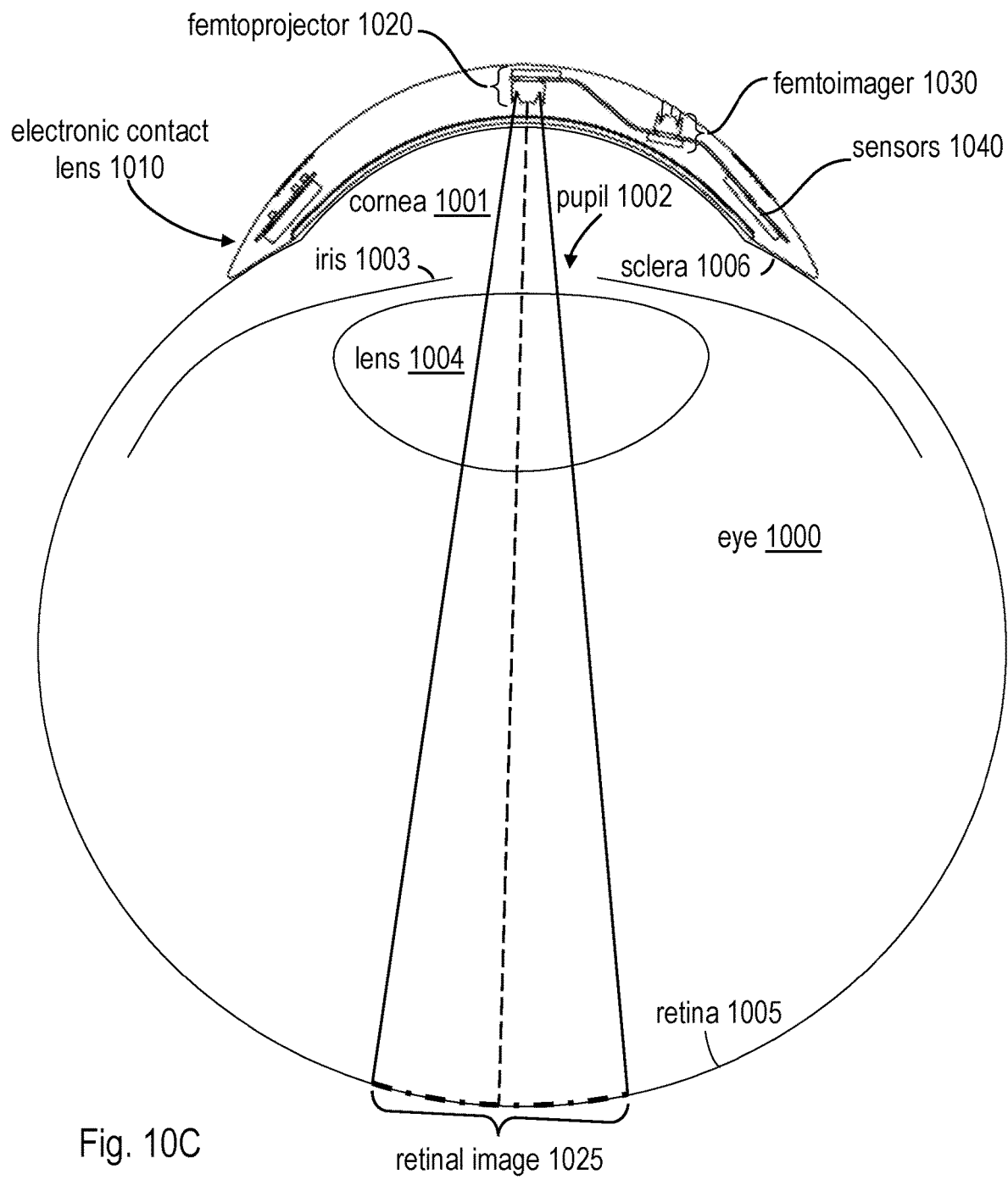
FIG. 10C shows a cross sectional view of the electronic contact lens mounted on the user's eye.

FIGS. 10A-C illustrate examples of an electronic contact lens that may be utilized as an augmented reality device 110 in the above-described augmented reality system 100. FIG. 10A shows a user wearing a pair of electronic contact lenses 1010. In other instances, the user may wear only a single electronic contact lens 1010 in just one eye. FIG. 10B shows a magnified view of an electronic contact lens 1010, and FIG. 10C shows a cross sectional view of the electronic contact lens 1010. The following examples use a scleral contact lens in which the contact lens is supported by the sclera of the user's eye, but the contact lens does not have to be scleral.

As shown in FIG. 10B, the electronic contact lens 1010 contains a femtoprojector 1020, an optional femtoimager 1030, and sensors 1040. The femtoprojector 1020 is a small projector that projects images inward onto the user's retina. It is located in a central region of the contact lens 1010, so that light from the femtoprojector 1020 propagates through the user's pupil to the retina. The femtoprojector 1020 typically includes an electronics backplane (e.g., driver circuitry), a front plane of light emitting elements (e.g., an LED array) and projection optics. The front plane produces an image (referred to as the source image), which is optically projected by the projection optics through the various eye structures and onto the retina 1005, as shown in FIG. 10C.

The optional femtoimager 1030 is a small imager that is outward facing and captures images of the external environment. In this example, it is located outside the central region of the contact lens 1010 so that it does not block light from entering the user's eye. The femtoimager 1030 typically includes imaging optics, a sensor array, and sensor circuitry. The imaging optics images a portion of the external environment onto the sensor array, which captures the image. The sensor array may be an array of photosensors.

The sensors 1040 and other associated electronics may be mounted on a flexible bus located in a peripheral zone of the electronic contact lens 1010. The sensors 1040 may include motion sensors such as an accelerometer and a gyroscope. The sensors 1040 may furthermore include a magnetometer and additional sensors such as temperature sensors, light sensors, and audio sensors. Sensed data from the sensors 1040 may be combined to estimate position, velocity, acceleration, orientation, angular velocity, angular acceleration or other motion parameters of the eye. For example, in one embodiment, gyroscope data, magnetometer data, and accelerometer data may be combined in a filter to estimate the orientations. Furthermore, gyroscope measurements may be compensated for variations in temperature.

The electronic contact lens 1010 may furthermore include various other electronic components (not shown) such as a radio transceiver, power circuitry, an antenna, a battery, or inductive charging coils. The electronic contact lens 1010 may also include cosmetic elements, for example covering the sensors 140 or other electronic components. The cosmetic elements may be surfaces colored to resemble the iris and/or sclera of the user's eye.

FIG. 10C shows a cross sectional view of the electronic contact lens mounted on the user's eye. FIG. 10C illustrates some structures of the eye 1000 including the cornea 1001, pupil 1002, iris 1003, lens 1004, retina 1005, and sclera 1006. The contact lens 1010 maintains eye health by permitting oxygen to reach the cornea 1001.

As shown in FIG. 10C, the optional femtoimager 1030 is outward-facing, so that it captures images of the surrounding environment, while the femtoprojector 1020 is inward-facing and projects an image 1025 onto the user's retina 1005. The femtoimager 1030, femtoprojector 1020, and sensors 1040 all move together with the eye 1000 because the electronic contact lens 1010 is physically mounted to the eye 1000. Thus, the sensors 1040 naturally capture motion of the eye. Furthermore, images captured by the femtoimager 1030 naturally have a line of sight corresponding to the user's gaze direction and virtual images projected by the femtoprojector 1020 naturally move together with the eye 1000.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software and/or combinations thereof. Implementations can be implemented in a computer program product tangibly embodied in a non-transitory computer-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Any of the foregoing can be supplemented by, or incorporated in, ASICs (application-specific integrated circuits) and other forms of hardware.

The invention claimed is:

1. A method for managing display of an icon in an eye tracking augmented reality device that concurrently enables a world view of an external environment of a viewer, the method comprising:
projecting the icon onto a retina of an eye such that the icon appears at a target position located at a predefined offset from a center of gaze outside a fovea;
estimating changes in orientation of the eye;
updating a tracked position of the icon based on the changes in orientation such that the icon appears to maintain a substantially stable appearance with respect to the world view;
detecting if repositioning criteria are met based on the tracked position;
if the repositioning criteria are not met, projecting the icon at the tracked position when the tracked position is within a projectable image space of the eye tracking augmented reality device; and
responsive to the repositioning criteria being met, repositioning the icon to the target position.

2. The method of claim 1, wherein repositioning the icon comprises:
removing the icon;
detecting when the changes in orientation of the eye meets stability criteria; and
responsive to detecting that the changes in orientation meet the stability criteria, re-displaying the icon at the target position.

3. The method of claim 1, detecting that the repositioning criteria are met comprises:
detecting that the tracked position of the icon is outside a predefined region around the target position.

4. The method of claim 1, wherein detecting that the repositioning criteria are met comprises:
detecting that the tracked position is outside the projectable image space of the eye tracking augmented reality device.

5. The method of claim 1, wherein detecting that the repositioning criteria are met comprises:
detecting a saccade having a predicted magnitude and direction that will result in the tracked position of the icon falling outside a predefined region around the target position.

6. The method of claim 1, wherein detecting that the repositioning criteria are met comprises at least one of:
detecting that the tracked position of the icon falls outside a first predefined region around the target position; and
detecting a saccade having a predicted magnitude and direction that will result in the tracked position of the icon falling outside a second predefined region around the target position, wherein the second predefined region is wider than the first predefined region.

7. The method of claim 1, wherein detecting that the repositioning criteria are met comprises:
detecting that an angular velocity of the eye is below a predefined angular velocity threshold.

8. The method of claim 1, further comprising:
removing the icon responsive to detecting that the center of gaze of the eye is outside a predefined region of interest in the world view; and redisplaying the icon at the target position responsive to detecting that the center of gaze of the eye moves within the predefined region of interest in the world view.

9. The method of claim 1, wherein detecting that the repositioning criteria are met comprises:
applying first repositioning criteria responsive to the center of gaze of the eye being within a predefined region of interest in the world view; and
applying second repositioning criteria responsive to the center of gaze of the eye being outside the predefined region of interest in the world view, wherein the second repositioning criteria is different than the first repositioning criteria.

10. The method of claim 1, further comprising:
detecting that selection criteria are met when the tracked position of the icon is within a predefined selection region within a threshold distance from the center of gaze; and
initiating a selection action responsive to meeting the selection criteria.

11. The method of claim 10, wherein initiating the selection action comprises:
changing an appearance characteristic of the icon relative to an initial appearance characteristic.

12. The method of claim 10, wherein initiating the selection action comprises:
causing the icon to temporarily lock to the center of gaze by displaying the icon at the center of gaze regardless of the changes in orientation of the eye.

13. The method of claim 10, wherein initiating the selection action comprises:
displaying a message associated with the icon.

14. The method of claim 10, wherein initiating the selection action comprises:
initiating a navigation action associated with a user interface.

15. The method of claim 1, wherein the projectable image space is defined by a span of eccentricity of an eye-mounted projector of an electronic contact lens.

16. The method of claim 1, wherein projecting the icon onto the retina comprises:
controlling, by a head-mounted display device based on the estimated changes in orientation of the eye, the projectable image space to be projected onto the retina and centered substantially at the center of gaze.

17. A non-transitory computer-readable storage medium storing instructions for managing display of an icon in an eye tracking augmented reality device that concurrently enables a world view of an external environment of a viewer, the instructions when executed by a processor causing the processor to perform steps comprising:
projecting the icon onto a retina of an eye such that the icon appears at a target position located at a predefined offset from a center of gaze outside a fovea;
estimating changes in orientation of the eye;
updating a tracked position of the icon based on the changes in orientation such that the icon appears to maintain a substantially stable appearance with respect to the world view;
detecting if repositioning criteria are met based on the tracked position;
if the repositioning criteria are not met, projecting the icon at the tracked position when the tracked position is within a projectable image space of the eye tracking augmented reality device; and responsive to the repositioning criteria being met, repositioning the icon to the target position.

18. The non-transitory computer-readable storage medium of claim 17, further comprising:
   detecting that selection criteria are met when the tracked position of the icon is within a predefined selection region within a threshold distance from the center of gaze; and
   initiating a selection action responsive to meeting the selection criteria.

19. An eye tracking augmented reality device that manages display of an icon while concurrently enabling a world view of an external environment of a viewer, the eye tracking augmented reality device comprising:
   a display to project the icon onto a retina of an eye such that the icon appears at a target position located at a predefined offset from a center of gaze outside a fovea;
   an eye orientation tracking system to estimate changes in orientation of the eye;
   a processing device, comprising:
   a processor; and
   a non-transitory computer-readable storage medium storing instructions that when executed by the processor cause the processor to perform steps comprising:
      updating a tracked position of the icon based on the changes in orientation such that the icon appears to maintain a substantially stable appearance with respect to the world view;
      detecting if repositioning criteria are met based on the tracked position;
      if the repositioning criteria are not met, causing the display to project the icon at the tracked position when the tracked position is within a projectable image space of the display; and
      responsive to the repositioning criteria being met, repositioning the icon to the target position.

20. The eye tracking augmented reality device of claim 19,
   wherein the eye tracking augmented reality device comprises an electronic contact lens,
   wherein the display comprises an eye-mounted projector of the electronic contact lens, and
   wherein the eye orientation tracking system comprises at least one eye-mounted motion sensor for sensing the changes in orientation of the eye.

21. The eye tracking augmented reality device of claim 19,
   wherein the eye tracking augmented reality device comprises a head-mounted device, and
   wherein the eye orientation tracking system comprises:
   an eye-facing camera to capture video of the eye; and
   a tracking module for deriving the changes in orientation from image-based features of the video.

22. A method for managing display of an icon in an eye tracking augmented reality device that concurrently enables a world view of an external environment of a viewer, the method comprising:
   detecting criteria for displaying an icon;
   initially projecting the icon onto a retina of an eye such that the icon appears at a target position located at a predefined offset from a center of gaze in an annular region of the retina outside of a fovea;
   estimating changes in orientation of the eye;
   updating a tracked position of the icon based on the changes in orientation such that the icon appears to maintain a substantially stable appearance with respect to the world view;
   detecting if selection criteria are met based on the tracked position;
   if the selection criteria are not met, projecting the icon at the tracked position when the tracked position is within a projectable image space of the eye tracking augmented reality device; and
   responsive to the selection criteria being met, initiating a selection action associated with the icon.

* * * * *